United States Patent
Tsuchimoto et al.

[11] Patent Number: 5,755,848
[45] Date of Patent: May 26, 1998

[54] PLUNGER SUPPORTING MECHANISM

[75] Inventors: Yoshihiro Tsuchimoto; Toshihito Kamioka; Manabu Nito, all of Funabashi, Japan

[73] Assignee: Asahi Glass Company Ltd., Tokyo, Japan

[21] Appl. No.: 681,407

[22] Filed: Jul. 23, 1996

[30] Foreign Application Priority Data

Oct. 30, 1995 [JP] Japan ................. 7-281678
Dec. 1, 1995 [JP] Japan ................. 7-314435

[51] Int. Cl.$^6$ ........................................ G03B 11/06
[52] U.S. Cl. ..................... 65/305; 65/308; 65/362; 425/412; 425/457
[58] Field of Search .............. 65/323, 322, 330, 65/331, 328, 362, 305, 308, 309, 316, 226; 425/457, 412; 72/406; 100/226

[56] References Cited

U.S. PATENT DOCUMENTS

| | | | |
|---|---|---|---|
| 1,889,881 | 12/1932 | Thompson | 65/305 |
| 2,966,006 | 12/1960 | Sherts et al. | 65/323 |
| 3,158,391 | 11/1964 | Carmi et al. | 65/323 |
| 3,416,909 | 12/1968 | Wilcock | 65/323 |
| 3,558,298 | 1/1971 | Carmi et al. | 65/362 |
| 3,660,067 | 5/1972 | Townsend, Jr. et al. | 65/362 |
| 4,043,724 | 8/1977 | Schubart | 425/412 |
| 4,632,689 | 12/1986 | De Willigen et al. | 65/323 |
| 4,737,182 | 4/1988 | Fecik et al. | 65/323 |
| 5,059,235 | 10/1991 | D'Iribarne et al. | 65/323 |

*Primary Examiner*—Steven P. Griffin
*Attorney, Agent, or Firm*—Oblon, Spivak, McClelland, Maier & Neustadt, P.C.

[57] ABSTRACT

A plunger supporting mechanism includes a bottom mold into which a gob is loaded; a plunger which is arranged above the bottom mold, and which is lowered to pressure the gob in the bottom mold to press the gob into a glass product, the plunger having an upper portion provided with a flange; a floating unit which supports the flange in a floating manner to support the plunger so as to be movable in a horizontal direction; and a press machine for raising and lowering the plunger through the floating unit; wherein the floating unit is supported so as to be tiltable with respect to the press machine, or the plunger is supported so as to be tiltable with respect to the flange.

18 Claims, 19 Drawing Sheets

FIGURE 18
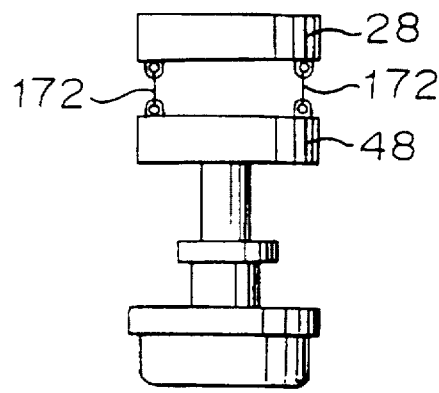
FIGURE 19
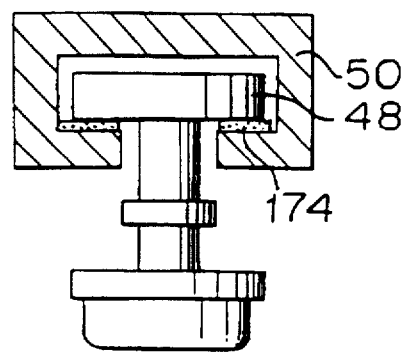
FIGURE 20
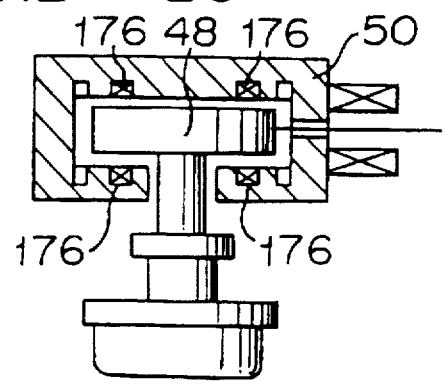

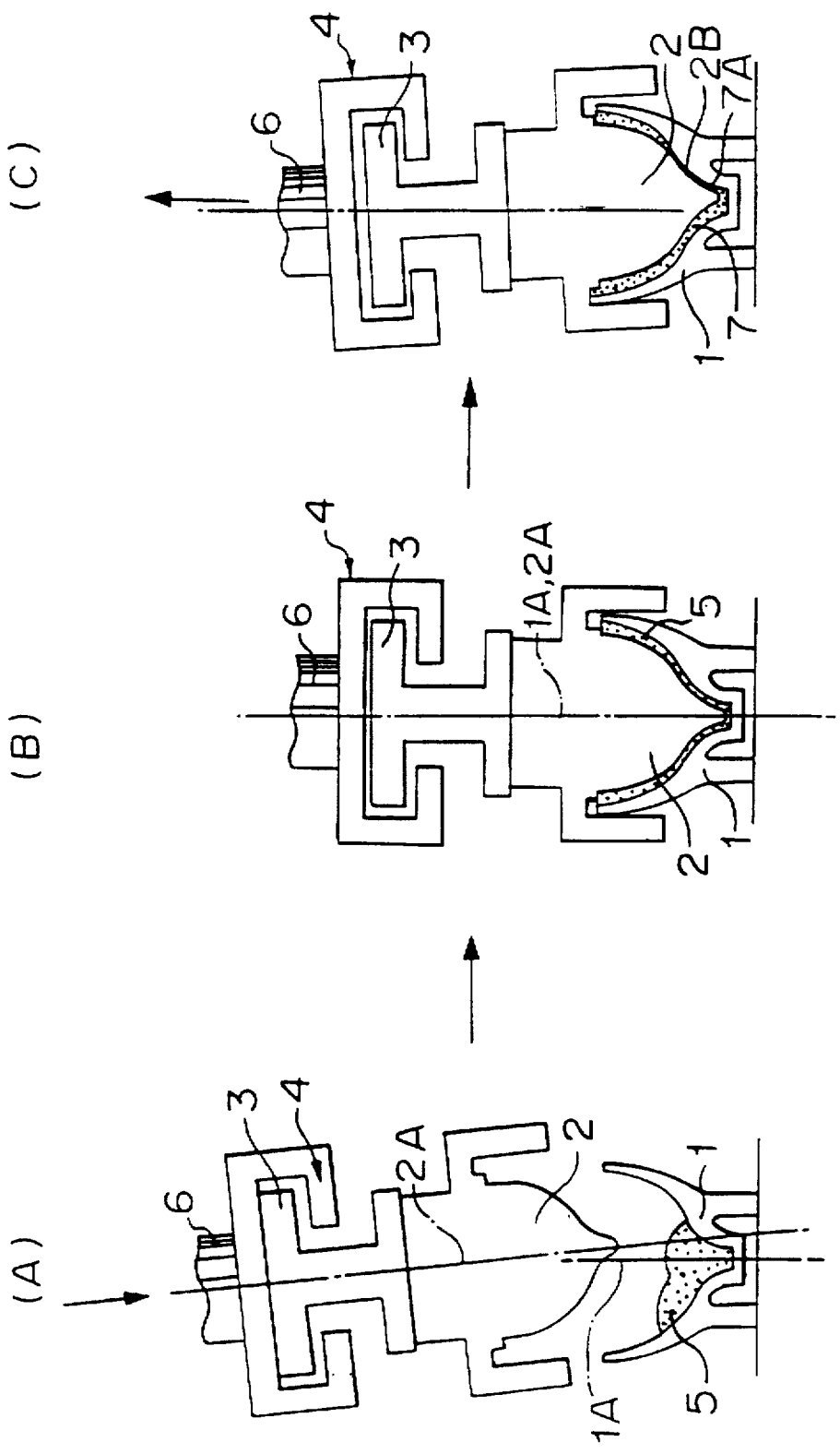

PLUNGER SUPPORTING MECHANISM

BACKGROUND OF THE INVENTION

1. Field of the Invention

The present invention relates to a plunger supporting mechanism for a press machine having a mold, wherein a molten glass gob (hereinbelow, referred to as the gob) which is loaded in a bottom mold is pressed by a plunger to obtain a glass formed product such as a panel glass and funnel glass, for a Braun tube or a CRT.

2. Discussion of Background

There has been known a press machine having a mold wherein the gob is loaded into a bottom mold, and a plunger arranged above the bottom mold is lowered by a press machine. The gob in the bottom mold is then subject to pressure, and is formed by the plunger to be pressed into a glass product. In such a press machine having a mold, it is necessary to align the plunger with the bottom mold because if the plunger and the bottom mold are out of alignment, variations are created in the wall thickness of produced glass products and the plunger and the bottom mold interfere with each other.

The applicants have proposed a plunger supporting mechanism which holds in a floating manner a plunger flange provided on top of a plunger to support the plunger so as to be movable in the horizontal direction, and which can guide the plunger to the bottom mold by use of a key and a key way to bring the plunger into alignment with the bottom mold.

The plunger supporting mechanism offers an advantage in that even if an axis 2A of the plunger 2 is out of alignment with an axis 1A of the bottom mold 1 as shown in FIG. 26(A), the gob 5 is pressurized and formed while the movement of the plunger 2 is rectified so as to put the axis 2A of the plunger 2 into alignment with the axis 1A of the bottom mold 1 as shown in FIG. 26(B). This is because the plunger flange 3 is supported in the floating manner by the plunger supporting mechanism 4.

However, in accordance with the plunger supporting mechanism, a rod 6 of a press machine follows the rectified movement of the plunger 2 to be elastically deformed (inclined). As a result, when the plunger 2 is raised from the bottom mold 1 by the press machine, a restoring force of the rod 6 is transmitted to the plunger 2 through the plunger supporting mechanism 4 and the plunger flange 3. Since the transmission of the restoring force functions to return the plunger 2 to the original position, the plunger 2 has a leading portion 2B contacted with a thin-walled base end 7A of a pressured and formed funnel glass 7, creating a problem in that the base end 7A of the funnel glass 7 is fissured or chipped.

The present invention has been made considering such circumstances. It is an object of the present invention to provide a plunger supporting mechanism for a press machine having a mold, which is capable of stably forming a glass product with good quality by preventing the glass product from being fissured or chipped.

In order to attain the object, the present invention provides a plunger supporting mechanism comprising a bottom mold into which a gob is loaded; a plunger which is arranged above the bottom mold, and which is lowered to pressure the gob in the bottom mold so as to press the gob into a glass product, the plunger having an upper portion provided with a flange; a floating unit which supports the flange in a floating manner to support the plunger so as to be movable in a horizontal direction; and a press machine for raising and lowering the plunger through the floating unit; wherein the floating unit is supported so as to be tiltable with respect to the press machine, or the plunger is supported so as to be tiltable with respect to the flange.

Giving attention to the facts that transmission of the restoring force of the press machine to the plunger through the floating unit is the cause of the fissure or the chip in a glass formed product, the present invention supports the floating unit so as to be tiltable with respect to the press machine, or the plunger is supported so as to be tiltable with respect to the flange in order to eliminate the cause.

In accordance with the present invention, the restoring force of the press machine on raising the plunger is absorbed by the tilting movement to prevent it from being transmitted to the floating unit. The plunger is raised, being in alignment with the bottom mold, i.e. being tilted and inclined by tilting means. As a result, a glass formed product is free from fissures or chips.

According to a second aspect of the present invention, the floating unit is provided with a re-centering mechanism, and an axis of the plunger is brought into alignment with an axis of the floating unit by the re-centering mechanism.

According to a third aspect of the present invention, a non-contacting type re-centering mechanism is adopted as the re-centering mechanism to bring the plunger axis into alignment with the floating unit axis in a non-contacting manner. The alignment in such a non-contacting manner can prevent the plunger flange from being worn, carrying out accurate alignment in comparison with the alignment in a contacting manner.

According to a fourth aspect of the present invention, the floating unit is suspended from and supported by the press machine by a plurality of hanger members, and the floating unit is supported so as to be tiltable by a spherical part provided on the hanger members. As a result, the floating unit is smoothly tiltable with respect to the press machine.

According to a fifth aspect of the present invention, use of a ball joint enables the tilting movement. As a result, the floating unit is smoothly tiltable with respect to the press machine.

According to a sixth aspect of the present invention, use of viscous resistance of a hydraulic fluid in a hydraulic fluid device enables the tilting movement. As a result, the floating unit is smoothly tiltable with respect to the press machine by the viscous resistance of the hydraulic fluid.

According to a seventh aspect of the present invention, the floating unit is held at a predetermined tilted position by use of position holding means. When the position holding means keeps the plunger in alignment with the bottom mold, i.e. tilted and inclined by the tilting means, the plunger can be raised keeping the inclined state, reliably preventing a glass formed product from being fissured or chipped.

According to an eighth aspect of the present invention, the floating unit is provided with a weight member to tilt the floating unit with respect to the press machine, thereby bringing an axis of the plunger into alignment with an axis of the bottom mold. The plunger pressures and forms the gob in alignment with the bottom mold, and the plunger is raised in alignment with the bottom mold on being raised. As a result, a glass formed product is free from fissures or chips.

According to a ninth aspect of the present invention, the floating unit is provided with a re-centering mechanism which supplies compressed air to a circumferential surface of the plunger flange to bring an axis of the plunger into alignment with an axis of the floating unit in a non-contacting manner. Such alignment in the non-contacting manner can prevent the plunger flange from being worn, carrying out accurate alignment in comparison with alignment in a contacting manner.

According to a tenth aspect of the present invention, the floating unit is formed with an orifice type nozzle which supplies compressed air to hold the plunger flange in the floating manner. Adoption of the orifice type nozzle has more flexibility in adjusting air pressure in comparison with a capillary choke nozzle. In addition, the plunger flange can be prevented from being subjected to self-excited vibrations, thereby supporting the plunger flange in the floating manner with good balance.

According to an eleventh aspect of the present invention, there is provided a plunger supporting mechanism comprising a bottom mold into which a gob is loaded; a plunger which is arranged above the bottom mold, and which is lowered to pressure the gob in the bottom mold to press the gob into a glass product, the plunger having an upper portion provided with a flange; a floating unit which supports the flange in a floating manner to support the plunger so as to be movable in a horizontal direction; and a press machine for raising and lowering the plunger through the floating unit; wherein there is provided plunger position holding means which causes the plunger to keep its position on pressing when the plunger is raised.

According to a twelfth aspect of the present invention, the plunger position holding means is constituted by a position adjusting member and an operating unit; the position adjusting member being at the floating unit, having an upper surface formed at a position opposed to a lower surface of the plunger flange so as to be movable in a vertical direction, and contacting the lower surface of the plunger flange to raise the plunger on raising the floating unit; and the operating unit adjusting a position of the upper surface of the position adjusting member so as to raise the plunger keeping the plunger in a position on pressing.

According to a thirteenth aspect of the present invention, there is provided a plunger supporting mechanism comprising a bottom mold into which a gob is loaded; a plunger which is arranged above the bottom mold, and which is lowered to pressure the gob in the bottom mold to press the gob into a glass product, the plunger having an upper portion provided with a flange; a floating unit which supports the flange in a floating manner to support the plunger so as to be movable in a horizontal direction; and a press machine for raising and lowering the plunger through the floating unit; wherein there is further provided alignment means for inclining an axis of the plunger to get into alignment with an axis of the bottom mold.

According to a fourteenth aspect of the present invention, the alignment means is constituted by tilt angle adjusting means for tilting the floating unit with respect to the press machine to make a tilt angle of the plunger axis match that of the bottom mold axis, and rotational angle adjusting means for rotating the floating unit with respect to the press machine to bring the plunger axis into alignment with the bottom mold axis.

According to a fifteenth aspect of the present invention, the plunger supporting mechanism further comprising a re-centering mechanism at the floating unit to bring an axis of the plunger into alignment with an axis of the floating unit.

According to a sixteenth aspect of the present invention, the re-centering mechanism is a non-contacting type of re-centering mechanism which brings the axis of the plunger into alignment with the axis of the floating unit in a non-contacting manner.

According to a seventeenth aspect of the present invention, the floating unit is provided with a re-centering mechanism which supplies compressed air to a circumferential surface of the plunger flange to bring the axis of the plunger into alignment with the axis of the floating unit in a non-contacting manner.

According to an eighteenth aspect of the present invention, the floating unit is formed with an orifice type nozzle, which supplies compressed air to hold the plunger flange in the floating manner.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 18 is a schematic view showing how the plunger flange is supported in the floating manner by a linkage system;

FIG. 19 is a schematic view showing how the plunger flange is supported in the floating manner by an oil film;

FIG. 20 is a schematic view showing how the plunger flange is supported in the floating manner by a magnetic force;

FIGS. 26(A)–(C) are schematic views illustrating the operation of a conventional plunger supporting mechanism.

DESCRIPTION OF THE PREFERRED EMBODIMENTS

Figure 1:
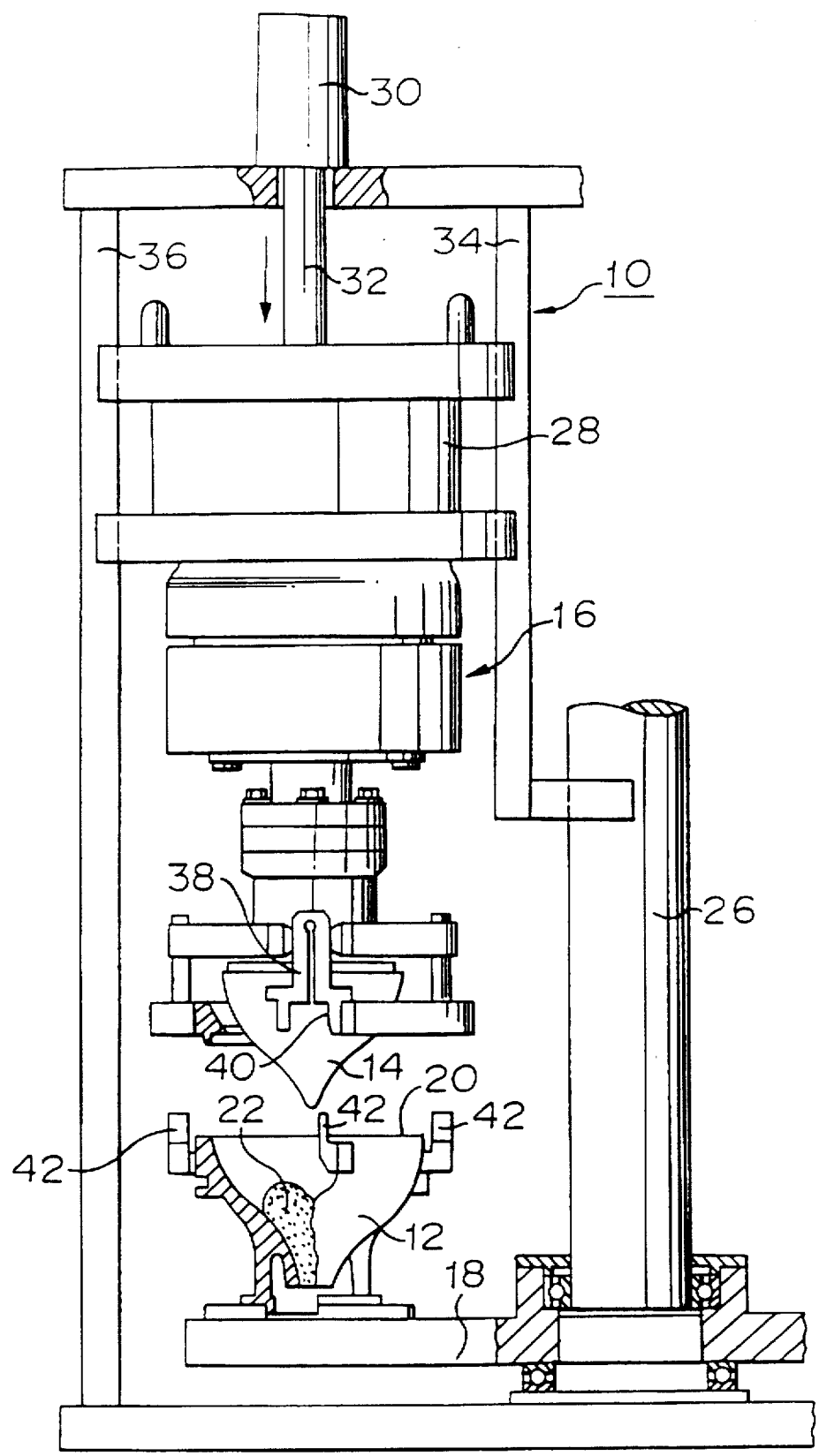
FIG. 1 is a side view of a press machine with mold, to which the plunger supporting mechanism according to a first embodiment of the present invention is applied.

Now, preferred embodiments of the plunger supporting mechanism according to the present invention will be described in detail with reference to the accompanying drawings. In FIG. 1, there is shown a side elevation of the essential parts of a press machine having a mold for pressing funnel glass, to which the plunger supporting mechanism according to a first embodiment of the present invention is applied. The press machine with mold 10 as shown includes a bottom mold 12, a plunger 14, a plunger supporting mechanism 16 and the like.

Figure 2:
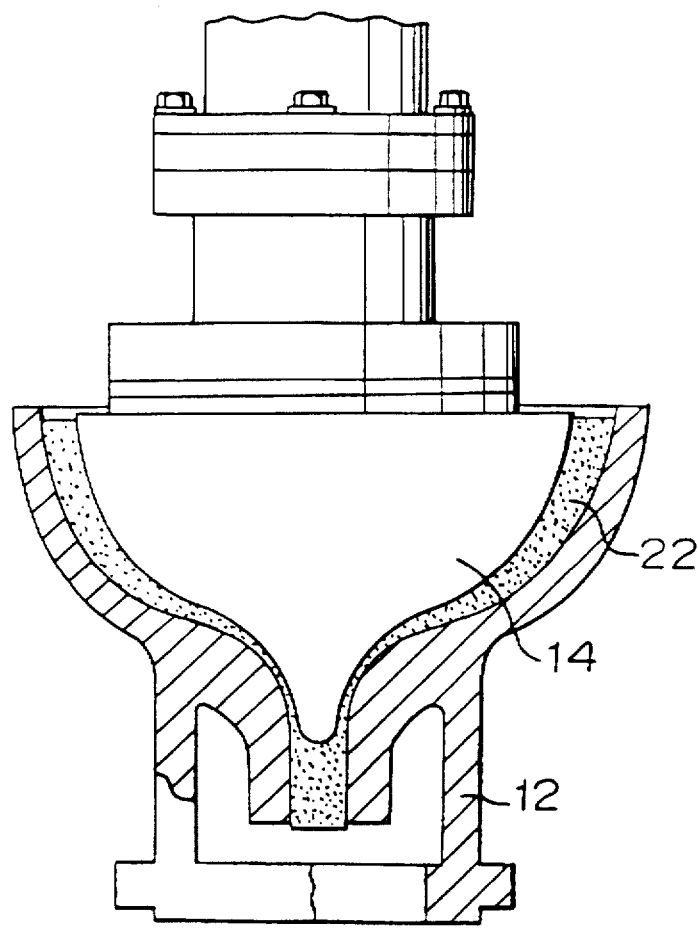
FIG. 2 is a schematic view showing in what state a plunger and a bottom mold are on shaping funnel glass.
Figure 3:
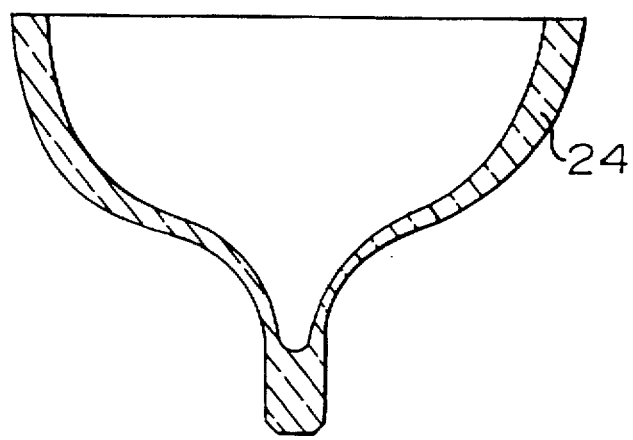
FIG. 3 is a sectional view of the funnel glass.

The bottom mold 12 is fixed on an index table 18, having an opened portion 20 directed upward, and a gob 22 is loaded in the bottom mold. The gob 22 is pressured and formed by a lowering movement of the plunger 14 as shown in FIG. 2, thereby being pressed to become funnel glass 24 as shown in FIG. 3. In FIG. 1, in practice, a plurality of the bottom molds 12 (eleven bottom molds in this case) are arranged on the index table 18 at predetermined intervals. The gobs 22 which have been loaded in the respective bottom molds are intermittently moved to a location below the plunger 14 by rotation of the index table 18, and are pressed into the funnel glass 24 by the plunger 14 one by one (see FIG. 3).

The plunger 14 has an upper portion supported by the plunger supporting mechanism 16. The plunger supporting mechanism 16 will be explained in detail later on. The plunger supporting mechanism 16 is fixed to a lower portion of a head 28, and a hydraulic cylinder 30 has a rod 32 fixed to an upper portion of the head 28. By extending and withdrawing the rod 32 of the hydraulic cylinder 30, the head 28 is lowered and raised being guided by an inner column 34 and an outer column 36, thereby lowering and raising the plunger 14 in a pressing direction and in a raising direction through the plunger supporting mechanism 16. The plunger 14 has a peripheral portion provided with a plurality of keys 38, and the bottom molds 12 have an upper portion provided with claws 42 which get in touch with key ways 40 formed in the keys 38 to guide the keys 38.

Figure 4:
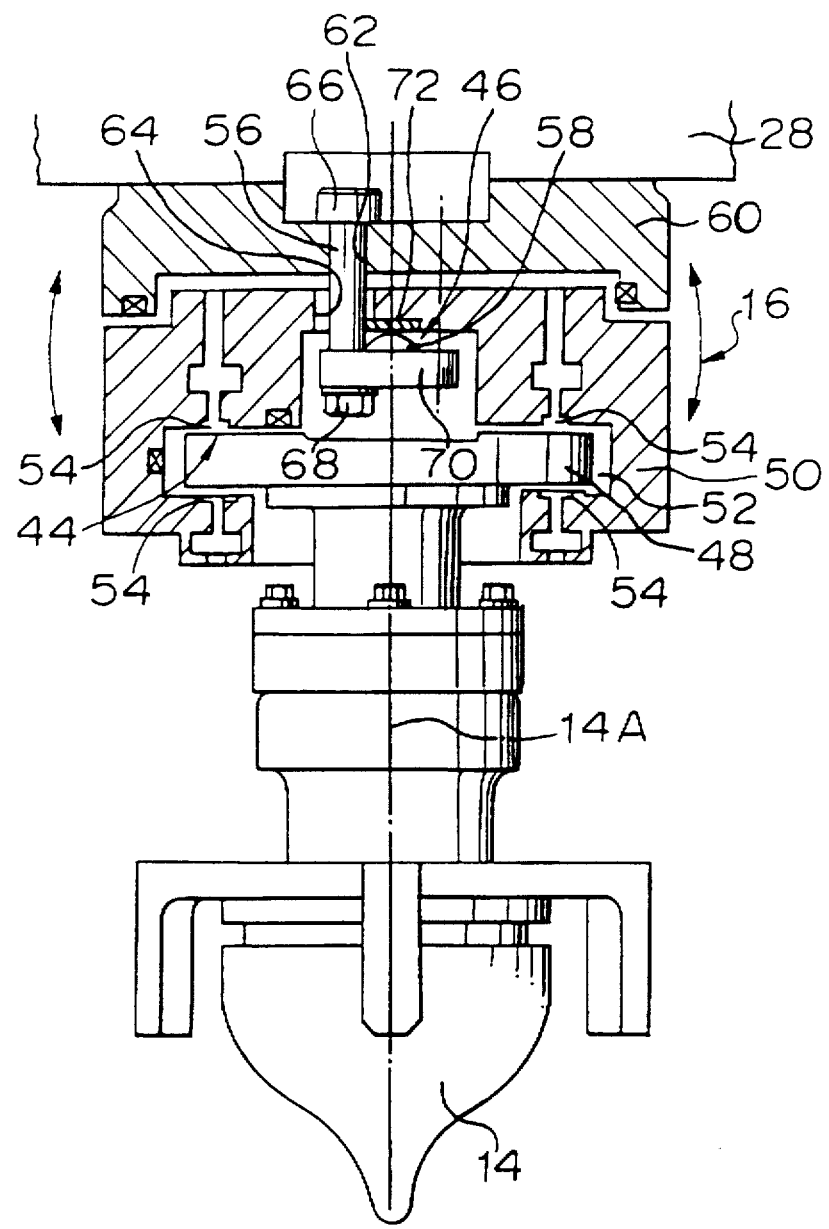
FIG. 4 is a sectional view of the plunger supporting mechanism shown in FIG. 1.

The plunger supporting mechanism 16 comprises a floating unit 44 and a tilting unit 46 as shown in FIG. 4.

The floating unit 44 uses compressed air to support, in a floating manner, a flange 48 which is provided on the upper portion of the plunger 14. The flange 48 is arranged in a space 52 which is formed in a frame part 50. The flange is supported in the floating manner by the compressed air which is supplied into the space 52 through capillary choke nozzles 54. A plurality of the capillary choke nozzles 54 are formed in an upper portion and a lower portion of the frame part 50, and the respective capillary choke nozzles 54 are connected to a compressed air supply source through pipes not shown.

The tilting unit 46 supports the floating unit 44 so as to be tiltable with respect to the head 28, and is constituted by hanger bolts 56 and a spherical part 58 like a ball joint bearing.

Three of the hanger bolts 56 are arranged on an imaginary concentric circle of the axis 14A of the plunger. Each hanger bolt 56 passes through holes 62 in an intermediate plate 60 fixed to the lower portion of the head 28 and through holes 64 formed in an upper portion of the frame part 50. Each hanger bolt 56 has an enlarged portion 66 formed on the top to be prevented from dropping out of a corresponding hole 62, and has a nut 68 screwed on the bottom to fix a common bearing supporting plate 70 so as to be prevented from dropping out of a corresponding hole 64. In that manner, the floating unit 44 is suspended from and supported by the head 28 through the three hanger bolts 56.

The bearing supporting plate 70 has the spherical part (spherical seat) 58 formed thereon. The spherical part 58 is located on the axis 14A of the plunger, and is pressed against a planar sheet 72 fixed to the frame part 50. Tilting movement of the floating unit 44 is smoothly carried out by the spherical part 58.

The operation of the plunger supporting mechanism as stated above according to the first embodiment will be explained referring to schematic views shown in FIGS. 5(A)–(C).

Figure 5:
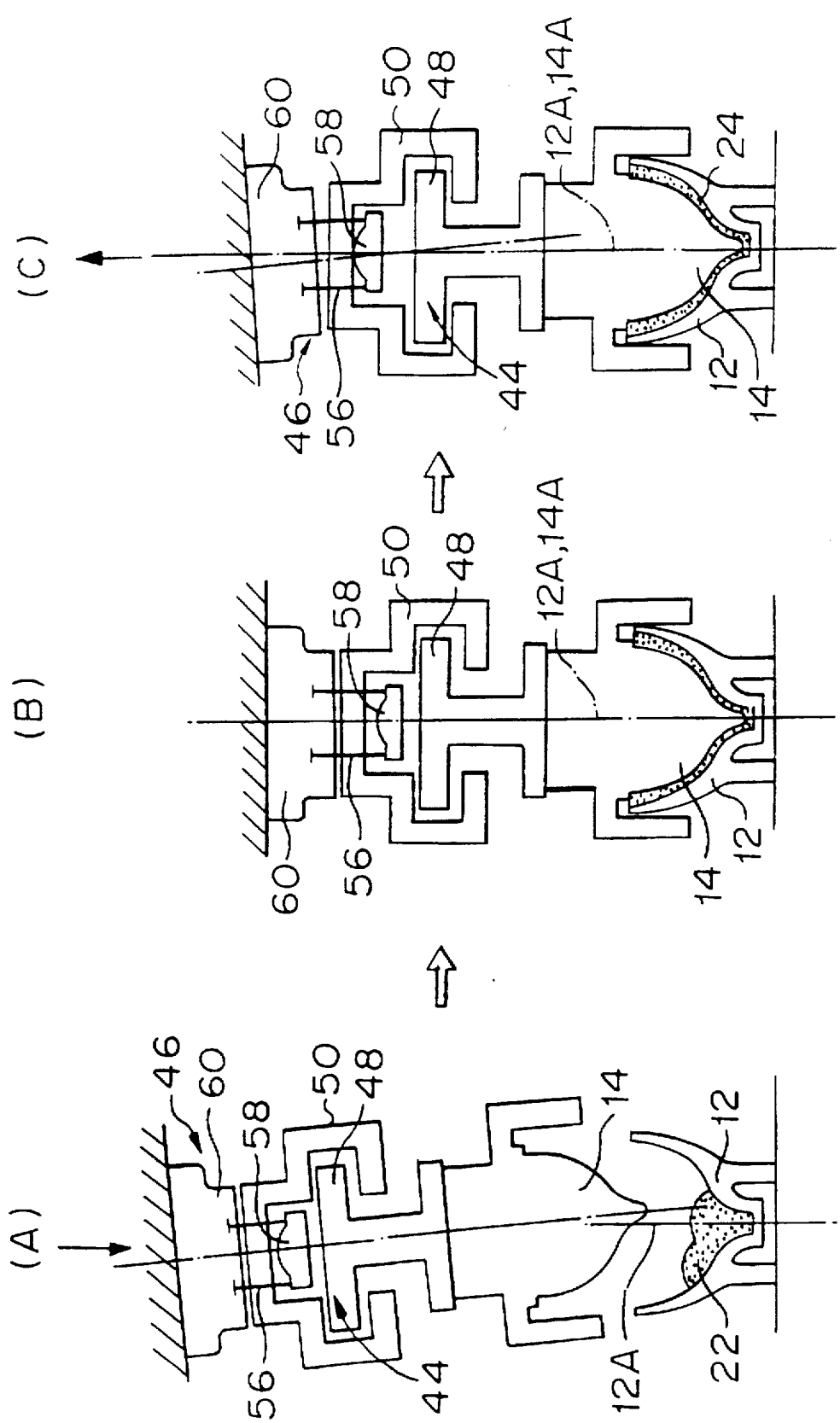
FIGS. 5(A)–(C) are schematic views illustrating the operation of the plunger supporting mechanism shown in FIG. 1.

Even if the axis 12A of the bottom mold 12 is out of alignment with the axis 14A of the plunger 14 on pressing as shown in FIG. 5(A), the plunger flange 48 is supported in the floating manner by the floating unit 44 under the action of the compressed air, and the plunger 14 pressures and forms the gob 22 as shown in FIG. 5(B) while the movement of the plunger 14 is rectified so as to bring the axis 14A of the plunger 14 into alignment with the axis 12A of the bottom mold 12. In that manner, the gob 22 is pressed into the funnel glass 24. At that time, the intermediate plate 60, and the head 28 and the rod 32 above the intermediate plate 60 (see FIG. 1) follow the rectified movement of the plunger 14 to be elasticly deformed (inclined).

When the plunger 14 is raised after completion of pressing, a restoring force which causes at e.g. the intermediate plate 60 at that time is absorbed by the tilting unit 46 as shown in FIG. 5(C) to be prevented from being transmitted to the floating unit 44. By this arrangement, the plunger 14 is raised in such a state that the axis 14A is in alignment with the axis 12A of the bottom mold 12, i.e. the plunger is tilted by the tilting unit 46 to be inclined. As a result, the plunger 14 does not have a leading edge scooped into the funnel glass 24. In accordance with the embodiment, the funnel glass 24 can be prevented from being fissured or chipped.

Figure 6:
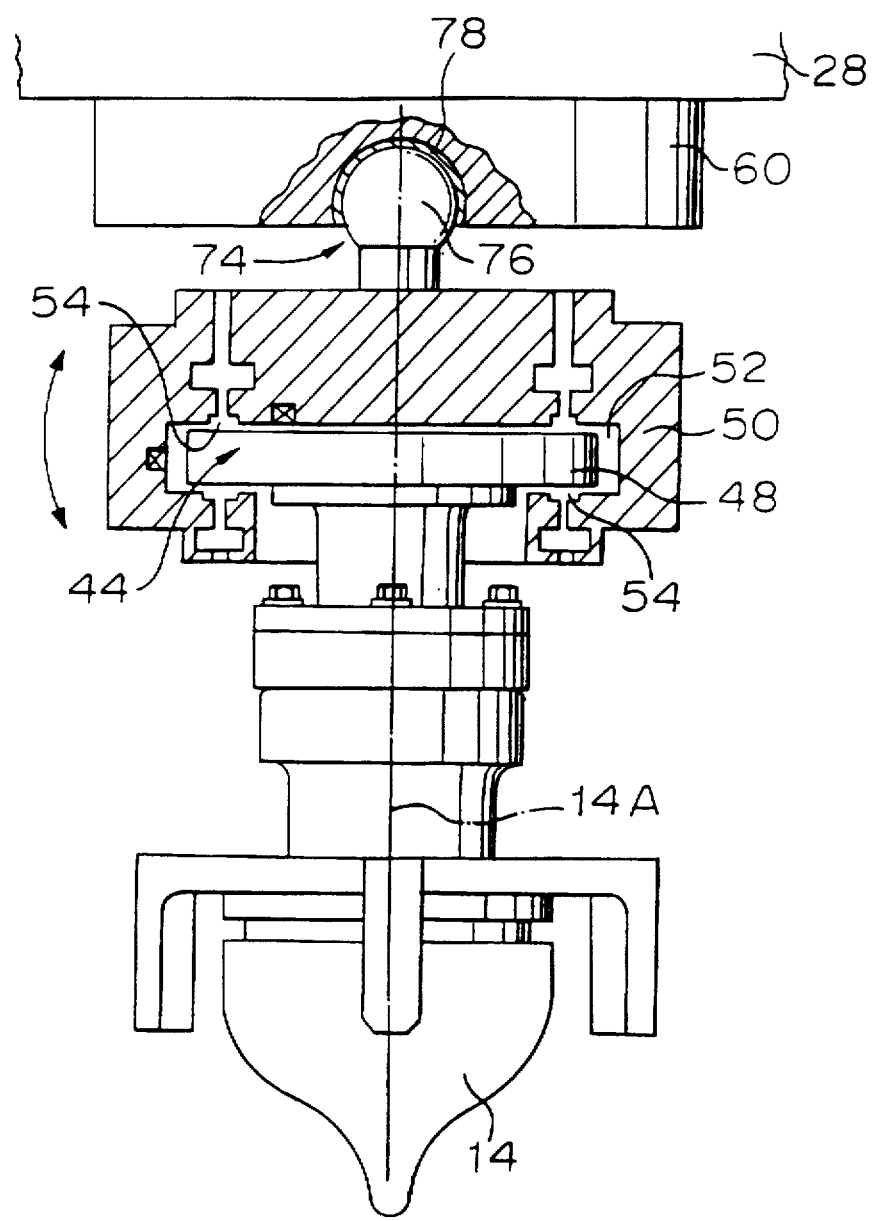
FIG. 6 is a sectional view of the plunger supporting mechanism according to a second embodiment of the present invention.

Referring now to FIG. 6, there is shown a sectional view of the essential parts of the plunger supporting mechanism according to a second embodiment of the present invention. Like reference numerals indicate identical or similar parts to the parts in the first embodiment shown in FIG. 4, and explanation on those parts will be omitted.

The plunger supporting mechanism shown in FIG. 6 adopts a ball joint 74 as the tilting unit. The ball joint 74 has a spherical portion 76 arranged above an upper surface of the frame part 50 so as to be located on the plunger axis 14A. The ball joint 74 has a spherical sheet 78 embedded in a lower portion of the intermediate plate 60.

The plunger supporting mechanism thus constructed allows the floating unit 44 to be tiltable with respect to the intermediate plate 60 like the plunger supporting mechanism shown in FIG. 4, preventing the funnel glass 24 from being fissured or chipped.

Figure 7:
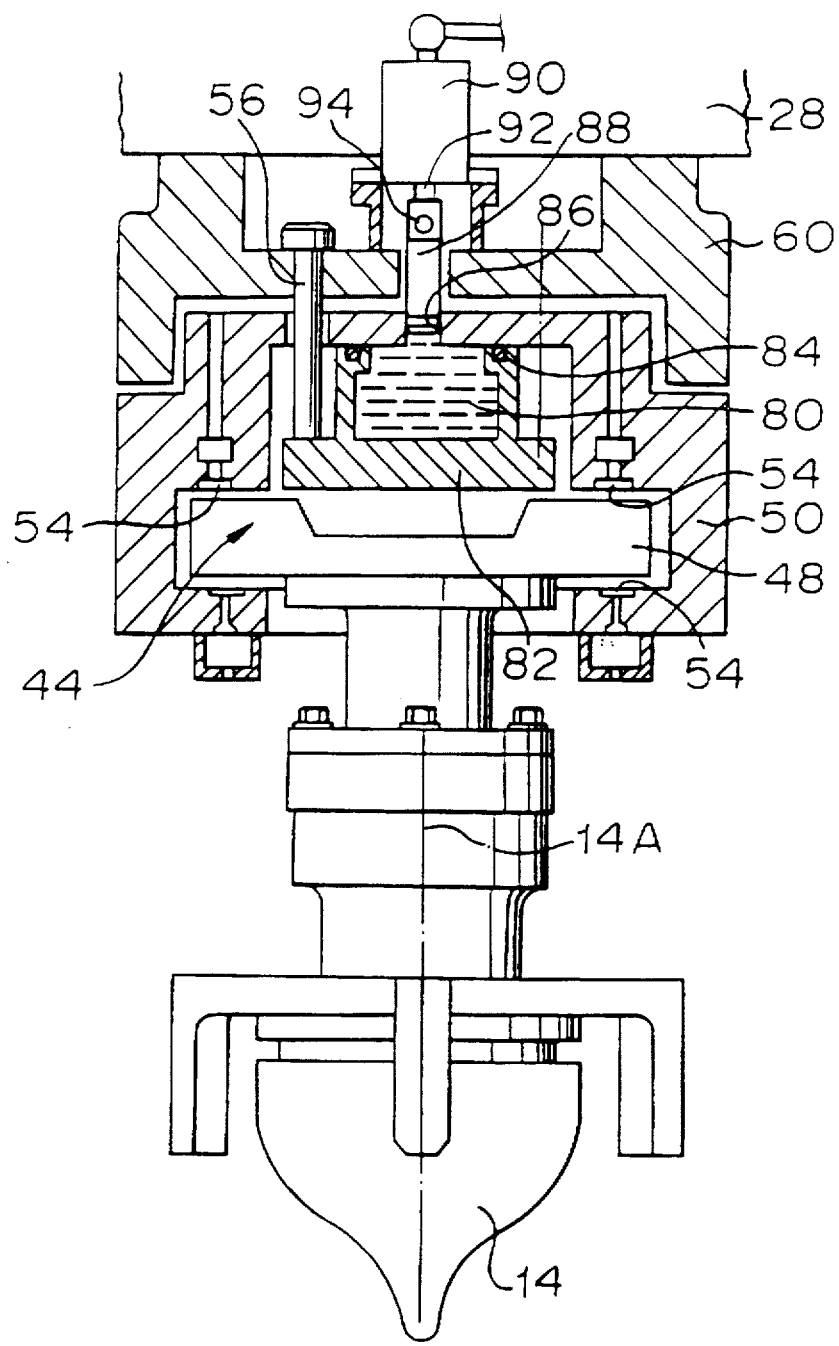
FIG. 7 is a sectional view of the plunger supporting mechanism according to a third embodiment of the present invention.

Referring now to FIG. 7, there is shown a sectional view of the essential parts of the plunger supporting mechanism according to a third embodiment of the present invention. Like reference numerals indicate identical or similar parts to the parts in the first embodiment shown in FIG. 4, and explanation on those parts will be omitted.

The plunger supporting mechanism shown in FIG. 7 adopts a hydraulic fluid 80 such as silicone or polybutene as the tilting unit. The hydraulic fluid 80 is filled in a vessel 82 which is fixed to a lower portion of each hanger bolt 56. The hydraulic fluid is sealed to the frame part 50 through packing 84 which is fitted in an upper edge of the vessel 82. The viscous resistance of the hydraulic fluid 80 allows the floating unit 44 to be tiltable with respect to the intermediate plate 60, preventing the funnel glass 24 from being fissured or chipped.

An opening 86, which communicates with the vessel 82, is formed in the upper portion of the frame part 50 so as to be located on the plunger axis 14A. The opening 86 has a piston 88 fitted therein to increase the pressure of the hydraulic fluid 80. The piston 88 is coupled to a rod 92 of a hydraulic cylinder 90 through a pin 94 so as to be tiltable.

When the rod 92 is extended to increase the pressure of the hydraulic fluid 80, a reaction force caused by the increased pressure can act on the frame part 50 to hold the floating unit 44 in a predetermined tilted position. In the third embodiment, the hydraulic cylinder 90, the piston 88 and other members constitute a position holding device for the floating unit 44.

In accordance with the third embodiment, when the hydraulic cylinder 90 is activated to increase the pressure of the hydraulic fluid 80 on raising the plunger 14, the plunger 14 is raised, being in alignment with the bottom mold 12, which ensures to prevent the funnel glass 24 from being fissured or chipped.

Figure 8:
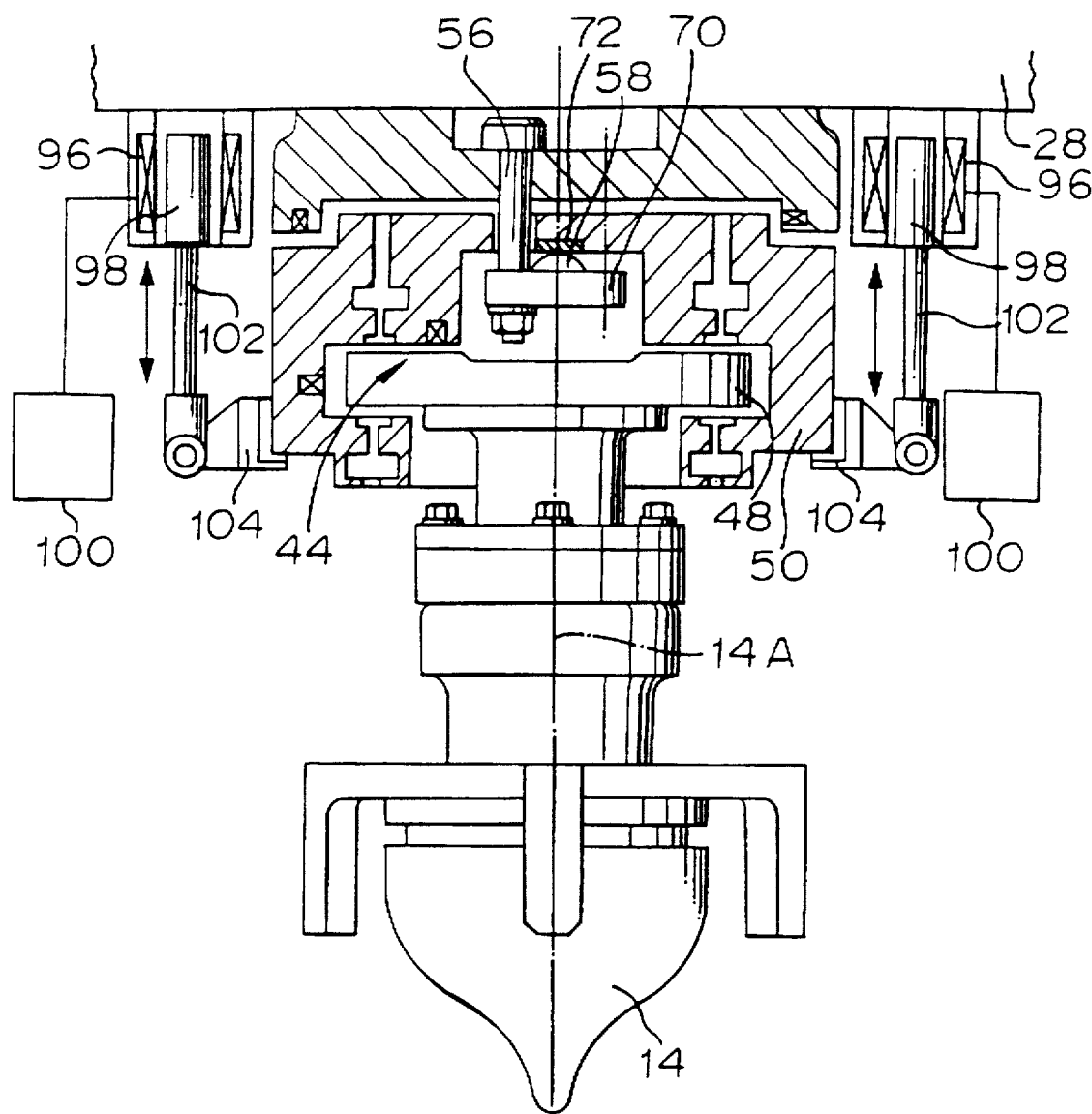
FIG. 8 is a schematic view of a first example of a position holding device which is applied to the plunger supporting mechanism shown in FIG. 1.

In FIG. 8, there is shown a case wherein the plunger supporting mechanism according to the first embodiment as shown in FIG. 4 is provided with position holding devices.

The position holding devices shown in FIG. 8 are of an electromagnetic type, comprising bobbins 96 and cores 98, respectively. A plurality of the position holding devices are arranged at a peripheral portion on a lower surface of the head 28 at predetermined intervals. Each bobbin 96 is fixed to the head 28, and the bobbin 96 has a corresponding core 98 housed therein. The core 98 is raised and lowered on energization to the bobbin 96 from a power source 100. The core 98 has a rod 102 fixed thereto, which in turn supports a receiving plate 104 having an L-character shape in section.

According to the position holding devices thus constructed, when the respective position holding devices are activated to raise the cores 98 on raising the plunger 14, the respective receiving plates 104 contact a lower surface of the frame part 50. By holding such a situation, the plunger 14 is raised being in alignment with the bottom mold 12, i.e. being inclined, thereby to reliably prevent the funnel glass 24 from being fissured or chipped.

Figure 9:
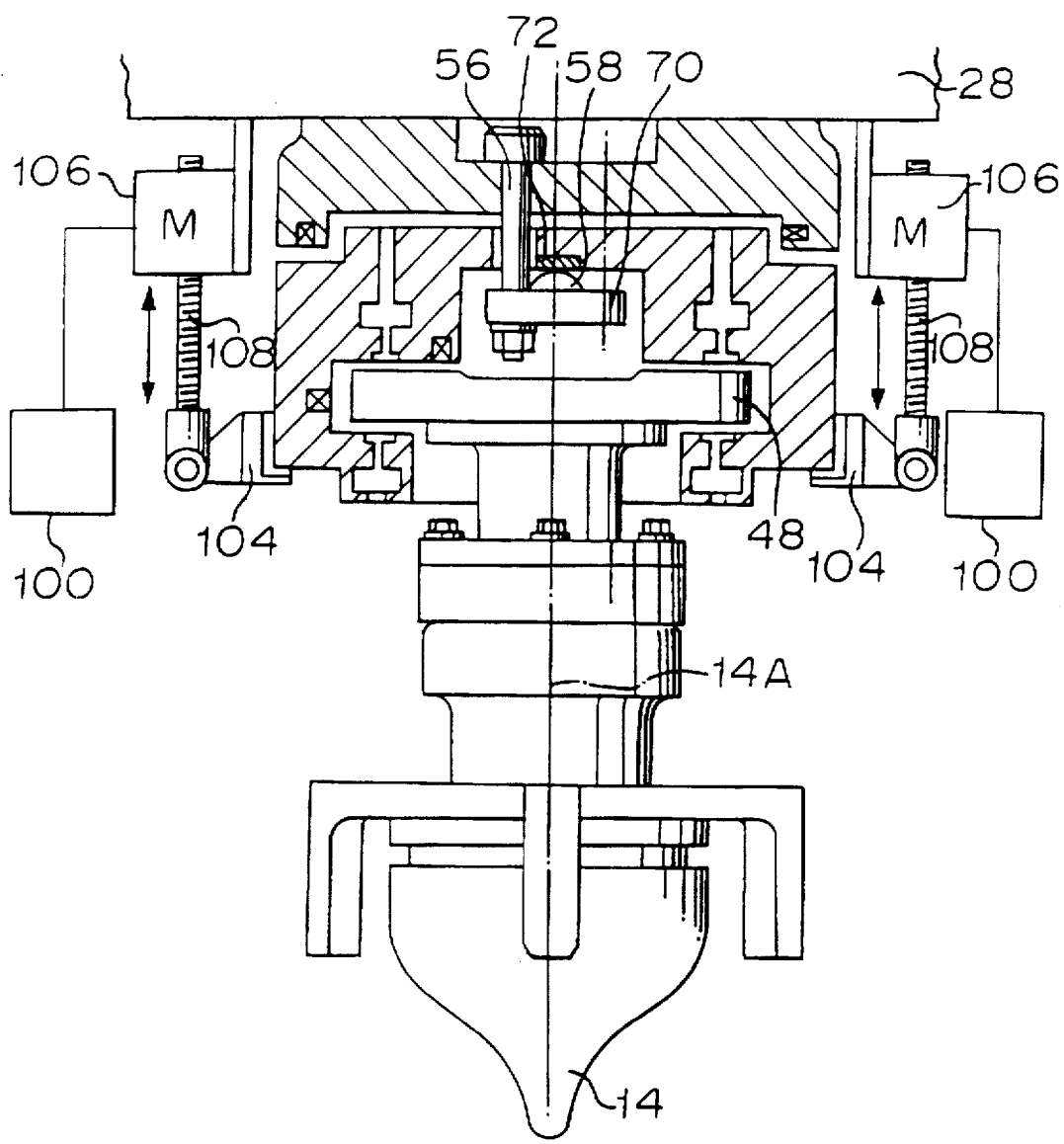
FIG. 9 is a schematic view showing a second example of position holding devices which are applied to the plunger supporting mechanism shown in FIG. 1.

In FIG. 9, there is shown a case wherein the electromagnetic type of position holding devices shown in FIG. 8 are replaced with mechanical type of position holding devices which comprise electric motors 106 and feed screws 108, respectively.

The electric motors 106 are arranged at the peripheral portion on the lower surface of the head 28 at predetermined intervals, the feed screws 108 are raised and lowered by rotation of the electric motors 106, respectively. The respective feed screws 108 have lower ends supporting the receiving plates 104, respectively.

According to the position holding devices thus constructed, when the respective electric motors 106 are activated to raise the feed screw 108 on raising the plunger 14, the respective receiving plates 104 contact the lower surface of the frame part 50. By holding such a situation, the plunger 14 is raised being in alignment with the bottom mold 12, i.e. being inclined, thereby to reliably prevent the funnel glass 24 being fissured or chipped.

Figure 10:
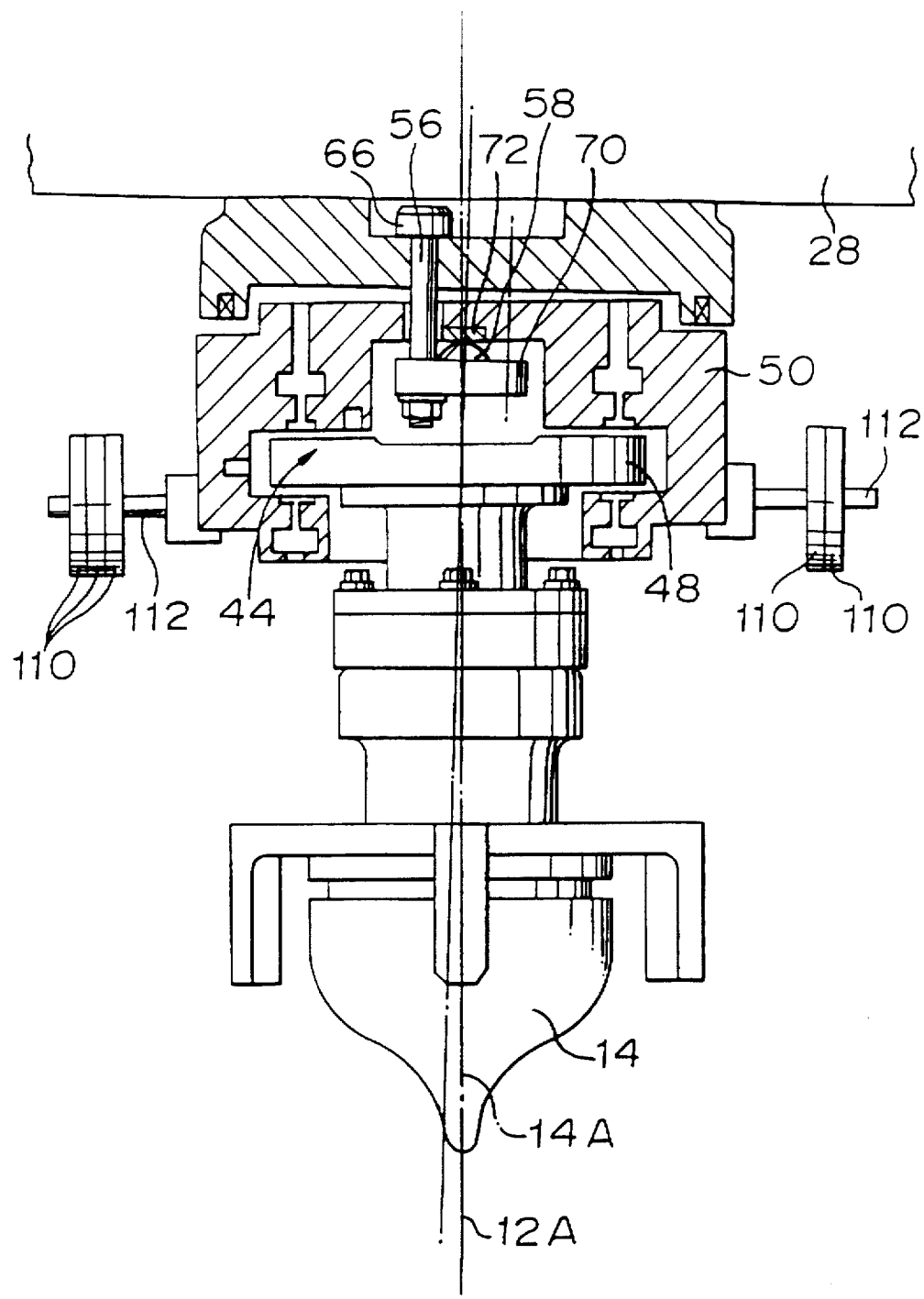
FIG. 10 is a schematic view illustrating how weight members are attached to the plunger supporting mechanism shown in FIG. 1 to get alignment with an axis of a bottom mold.

In FIG. 10, there is shown a case wherein the plunger supporting mechanism according to the first embodiment shown in FIG. 4 is provided with weight members 110 so as to be detouchable, thereby bringing the plunger axis 14A into alignment with the bottom mold axis 12A in advance.

Selected number of the weight members 110 are carried on bars 112 which are inserted into the frame part 50.

When the weight members 110 are used to get the plunger axis 14A into alignment with the bottom mold axis 12A in advance, the plunger 14 pressures and shapes the glass gob 22 keeping the axis 14A in alignment with the bottom mold axis 12A, and the plunger is raised keeping the axis 14A in alignment with the bottom mold axis 12A. As a result, the funnel glass 24 can be prevented from being fissured or chipped.

Figure 11:
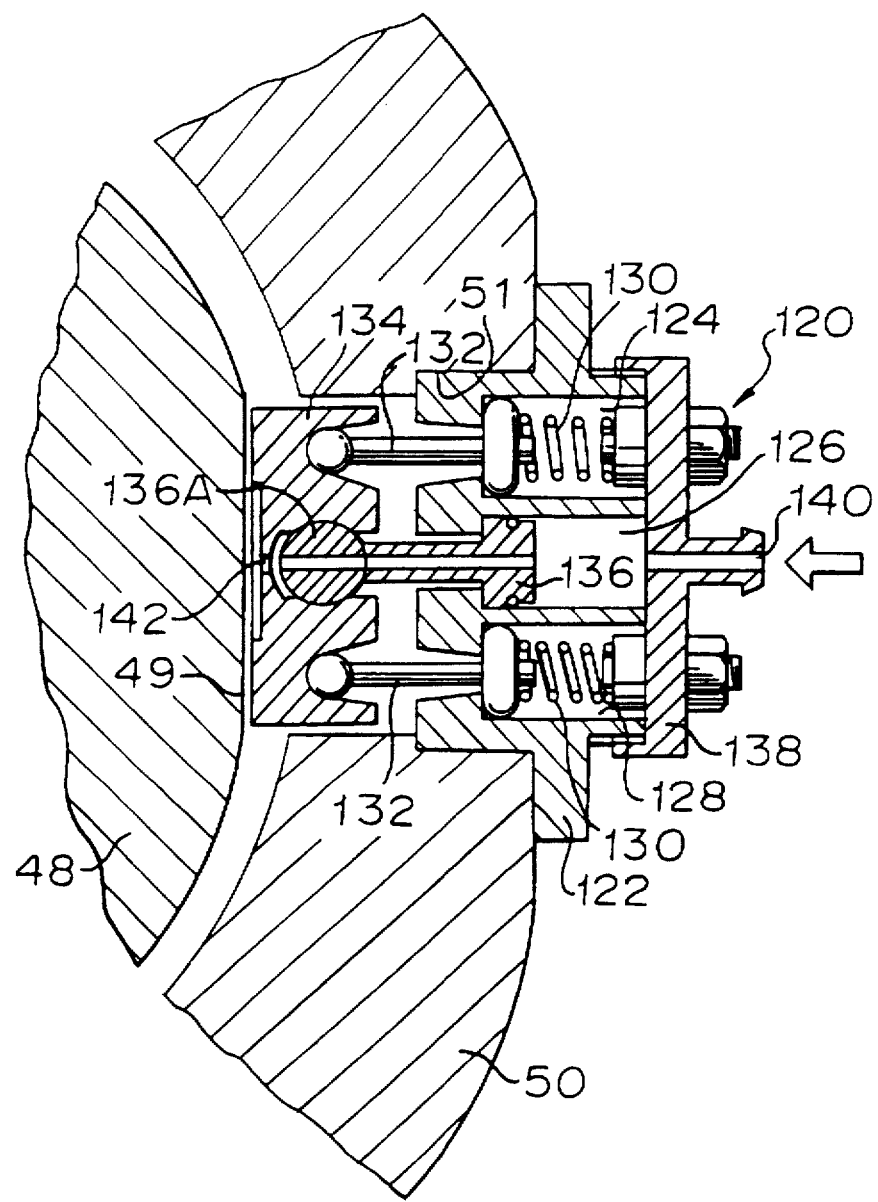
FIG. 11 is a sectional view showing the essential parts of a first example of a re-centering mechanism.

In FIG. 11, there is shown a sectional view of a first example of a re-centering mechanism. A plurality of the re-centering mechanisms function to bring the plunger axis into alignment with the axis of the floating unit, i.e. the axis of the frame part, and are used together with the plunger supporting mechanism as shown in FIG. 4, 6 or 7.

A plurality of the re-centering mechanisms 120 shown in FIG. 11 are arranged at a peripheral portion of the frame part 50 at predetermined intervals. Each re-centering mechanism 120 has a casing 122 which is inserted into and fixed in a hole 51 of the frame part 50. The casing 122 has three cylindrical spaces 124, 126, 128 formed therein. The spaces 124, 128 on opposite sides have springs 130 arranged therein, respectively. The spaces 124, 128 include pins 132 which have leading edges protruded from the spaces 124 and 128 under the action of the springs 130. The pins 132 have the leading edges provided with a common pad 134, which is urged toward a flat portion 49 on the circumference of the plunger flange 48 by the action of the springs 130.

The central space 126 has a nozzle 136 arranged therein so as to be slidable in the direction right and left in FIG. 11. The nozzle 136 functions to direct compressed air supplied from an air introduction hole 140 in a cover 138 of the casing 122 to an outlet nozzle 142 formed in the pad 134. By this arrangement, the compressed air is blown out from the outlet nozzle 142 toward the flat portion 49 on the circumference of the flange 48. The pad 134 is supported by a spherical leading end 136A of the nozzle 136 so as to be tiltable.

According to the re-centering mechanisms 120 thus constructed, when the outlet nozzles 142 of the re-centering mechanisms 120 simultaneously flow out the compressed air toward the flat portions 49 of the flange 48 under the same pressure, the flange 48 is pushed by the air pressure of the compressed air to be rectified so as to put the plunger axis into alignment with the axis of the floating unit. At that time, each pad 134 goes away from the corresponding flat portion 49 on the circumference of the flange 48 against the action of the springs 130 since the pad is reacted by the air pressure. As a result, the flange 48 can return to the original position keeping a non-contact relation with the pads 134.

As explained, the re-centering mechanisms 120 according to the example can bring the plunger axis into alignment with the axis of the floating unit in such a non-contacting manner to prevent the plunger flange 48 from being worn, thereby carrying out more accurate alignment in comparison with a re-centering mechanism wherein the alignment is made in a contacting manner.

If the flange 48 is deviated in a rotational direction, each pad 134 is to become in parallel with the corresponding flat portion 49 on the circumference of the flange 48, thereby causing a difference between the two pins 132, 132 in terms of their protruding amounts to differentiate between the springs 130, 130 in terms of the compressed amounts (urging forces). However, at that time, each pad 134 starts returning to the original position shown in FIG. 11 since the urging force of a spring 130 with a more compressed amount is stronger than that of the spring 130 with the less compressed amount. The flange 48 follows the returning movement of the pads 130 to start rotating to the original position. As a result, the flange 48 returns to the original rotational position.

Figure 12:
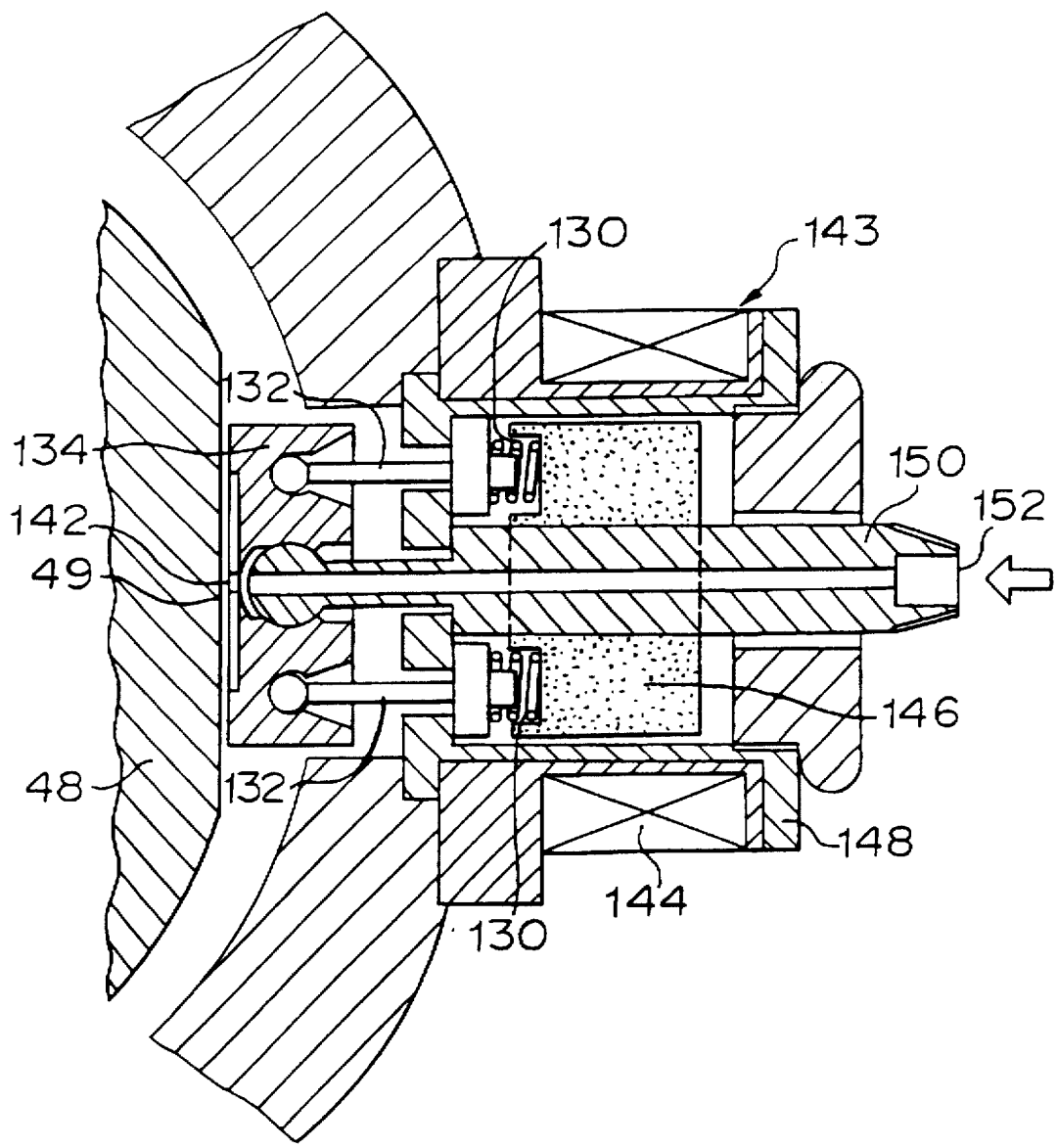
FIG. 12 is a schematic view showing the essential parts of a second example of a re-centering mechanism.

In FIG. 12, there is shown a sectional view of a second example of the re-centering mechanisms. Like reference numerals indicate identical or similar parts to those of the re-centering mechanisms 120 shown in FIG. 11, and explanation on those parts will be omitted.

The re-centering mechanisms 143 shown in FIG. 12 are of an electromagnetic type, adopting bobbins 144 and cores 146, respectively. Each bobbin 144 is fixed to an outer circumferential portion of a cylindrical casing 148. Each core 146 is arranged in the cylindrical casing 148 so as to be slidable along an inner circumferential portion thereof, and the displacing amount of the core is controlled depending on the value of a voltage applied to the bobbin 144.

The core 146 has pins 132 arranged thereon through springs 130. The pins 132 has leading edges provided with a common pad 134. The casing 148 has a central portion provided with a nozzle 150 so as to be movable in the direction right and left in FIG. 12. The nozzle 150 functions to direct compressed air supplied from an air introduction hole 152 to an outlet nozzle 142 formed in the pad 134.

In accordance with the re-centering mechanisms 143 thus constructed, first, a predetermined voltage is applied to each bobbin 144 to move the corresponding core 146 toward the flange 48 so as to bring the corresponding pad 134 near the corresponding flat portion 49 on the circumference of the flange 48. Next, when the outlet nozzles 142 of the re-centering mechanisms 143 simultaneously flow the compressed air toward the flat portions 49 of the flange 48 under the same pressure, the flange 48 is pushed by the air pressure of the compressed air to be rectified so as to bring the plunger axis into alignment with the axis of the floating unit. At that time, each pad 134 goes away from the corresponding flat portion 49 on the circumference of the flange 48 against the action of the springs 130 since the pad is reacted by the air pressure. As a result, the flange 48 can return to the original position keeping a non-contacting relation with the pads 134.

As explained, like the re-centering mechanisms 120 shown in FIG. 11, the re-centering mechanisms 143 according to the second example can also bring the plunger axis into alignment with the axis of the floating unit in such a non-contacting manner to prevent the plunger flange 48 from being worn, thereby carrying out accurate alignment.

If the flange 48 is deviated in a rotational direction, each pad 134 is to become parallel with the corresponding flat portion 49 on the circumference of the flange 48, thereby causing a difference between the two pins 132, 132 in terms of their protruding amounts to differentiate between the springs 130, 130 in terms of their compressed amounts (urging forces). However, at that time, each pad 134 starts returning to the original position shown in FIG. 12 since the urging force of a spring 130 with a more compressed amount is stronger than the urging force of the spring 130 with the less compressed amount. The flange 48 follows the returning movement of the pad 134 to start rotating to the original position. As a result, the flange 48 returns to the original rotational position.

Figure 13:
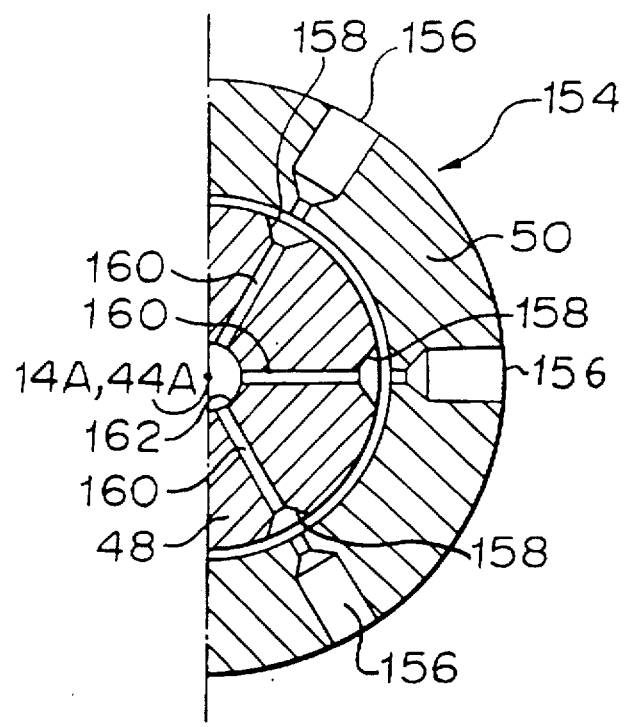
FIG. 13 is a sectional view showing half portions of a third example of the re-centering mechanism.
Figure 14:
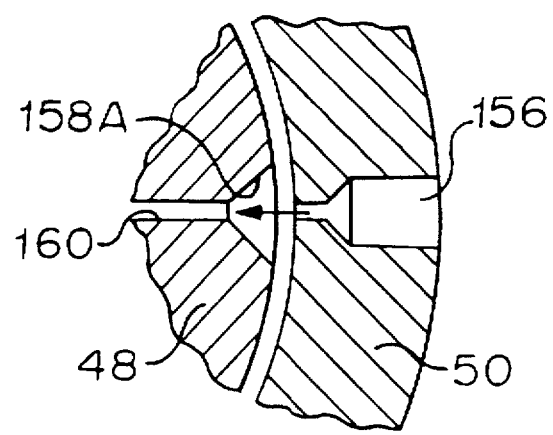
FIG. 14 is an enlarged sectional view of the essential parts of the third example of the re-centering mechanism.

In FIG. 13, there is a sectional view showing half portions of the flange 48 and the frame part 50, to which a re-centering mechanism according to a third example is applied. In FIG. 14, there is shown an enlarged sectional view of the essential parts of the re-centering mechanism.

The re-centering mechanism 154 shown in FIGS. 13 and 14 is constituted by nozzles 156 which are formed in the circumferential part of the frame part 50 at predetermined intervals to blow compressed air toward the outer circumferential part of the flange 48, and air receiving surfaces 158 which are formed on the outer circumferential surfaces of the flange 48 in a countersink-form to receive the compressed air.

The respective air receiving surfaces 158 communicate with air exhaust passages 160, and the air exhaust passages 160 in turn communicate with an exhaust hole 162 which is formed at a central portion of the flange 48.

According to the re-centering mechanism 154 thus constructed, when the nozzles 156 of the re-centering mechanism 154 simultaneously flow out the compressed air toward the outer peripheral surface of the flange 48 under the same pressure, the flange 48 is pushed by the air pressure of the compressed air to be moved so as to return to the original position where the plunger axis 14A is in alignment with the axis 44A of the floating unit.

If the flange 48 is deviated in a rotational direction, the compressed air which has been blown out from the nozzles 156 collide with countersunk surfaces 158A of the air receiving surfaces 158. As a result, a force in the rotational direction is applied to the flange 48 by co-operation of the compressed air and the countersunk surfaces 158A to rotate the flange 48, and the flange stops at the original rotational position (the rotational position shown in FIG. 14) where the compressed air does not collide with the countersunk surfaces 158A. In that manner, positional deviation of the flange 48 in the rotational direction is rectified.

Figure 15:
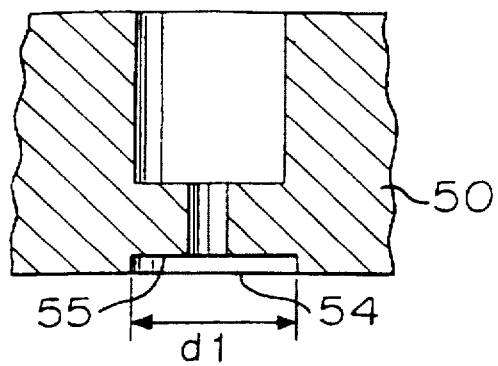
FIG. 15 is a sectional view of a capillary choke nozzle.
Figure 16:
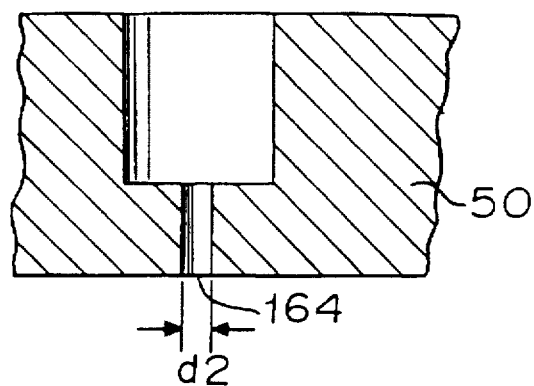
FIG. 16 is a sectional view of an orifice type nozzle.

In FIG. 15, there is shown an enlarged sectional view of one of the capillary choke nozzles 54 with a recess 55 which are formed in the frame part 50. In FIG. 16, there is shown an enlarged sectional view of one of orifice type nozzles 164 which are adopted instead of the capillary choke nozzles 54, and which supply compressed air to hold the plunger flange 48 in the floating manner. Adoption of the orifice type nozzles 164 can have more flexibility in adjusting the air pressure in comparison with adoption of the capillary choke nozzles 54, and can prevent the plunger flange 48 from being subjected to self-excited vibrations, thereby holding the plunger flange 48 in the floating manner with good balance.

The recesses 55 which are formed in the capillary choke nozzles 54 have a diameter d1 of 20 mm while the orifice type nozzles 164 have a diameter d2 of 0.8 mm.

Although explanation on the embodiments and the examples as stated earlier has been made for the case wherein the present invention is applied to the press machine with mold 10 for pressing a funnel glass, the present invention is not limited to such a press machine, but is also applicable to a press machine with mold for pressing a panel.

Figure 17:
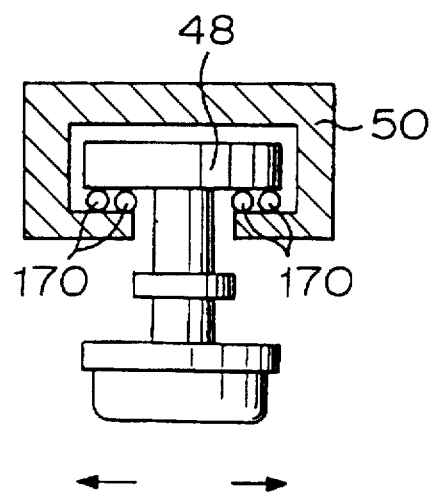
FIG. 17 is a schematic view showing how a plunger flange is supported in a floating manner by rolling means.

Although in the embodiments and the examples stated earlier, the compressed air is used to support the plunger flange 48 in the floating manner, the present invention is not limited to such supporting measures. For example, as shown in FIG. 17, rolling rollers 170 may be interposed between the plunger flange 48 and the frame part 50 to support the plunger flange 48 with respect to the frame part 50 in a floating manner by the rolling rollers 170. In addition, as shown in FIG. 18, the plunger flange 48 may be supported in a floating manner by the head 28 through a parallel linkage system 172 without using the frame part 50. Furthermore, as shown in FIG. 19, an oil film 174 may be formed between the plunger flange 48 and the frame part 50 to support the plunger flange 48 in the floating manner by the oil film 174. Still furthermore, as shown in FIG. 20, the frame part 50 may have an upper inner surface and a lower inner surface provided with electromagnets 176 to support the plunger flange 48 in a floating manner by magnetic forces from the electromagnets 176.

Although explanation on the embodiments and the examples as stated earlier has been made for the cases wherein the non-contacting type of re-centering mechanisms use the compressed air, the present invention is not limited to such re-centering mechanisms, but may use non-contacting type of re-centering mechanisms adopting non-contacting means such as a magnetic force, or an oil film.

Although, explanation on the embodiments and the examples as stated earlier has been made with respect to the non-contacting type of re-centering mechanisms, the present invention is not limited to such re-centering mechanisms, but may adopt non-contacting type re-centering mechanisms using springs. In this case, the springs can be arranged on the peripheral surface of the plunger flange 48 at predetermined intervals to push and contact with the plunger flange, thereby returning the plunger flange 48 to a position wherein the urging forces from the respective springs become equal, i.e. to the central position.

Figure 21:
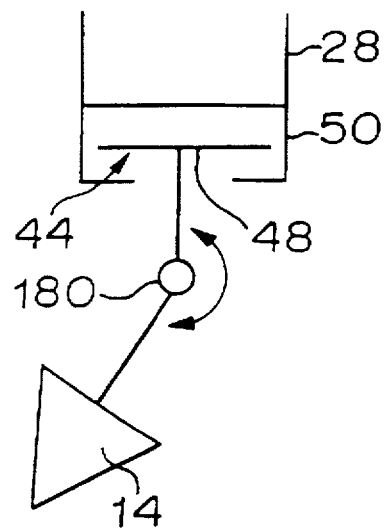
FIG. 21 is a schematic view illustrating how the plunger is supported by a ball joint so as to be tiltable with respect to the plunger flange.

In FIG. 21, there is shown a schematic view showing the principle of another embodiment of the plunger supporting mechanism according to the present invention.

The plunger supporting mechanism shown in FIG. 21 supports the plunger 14 by the plunger flange 48 through a ball joint 180 so as to be tiltable with respect to the plunger flange, which is different from the embodiments wherein the floating unit 44 is supported so as to be tiltable with respect to the press machine.

According to such a plunger supporting mechanism as well, the restoring force of the press machine which causes on raising the plunger 14 can be absorbed by tilting movement of the ball joint 180 to be prevented from being transmitted to the plunger 14, thereby avoiding a case wherein glass formed products are fissured or chipped.

Figure 22:
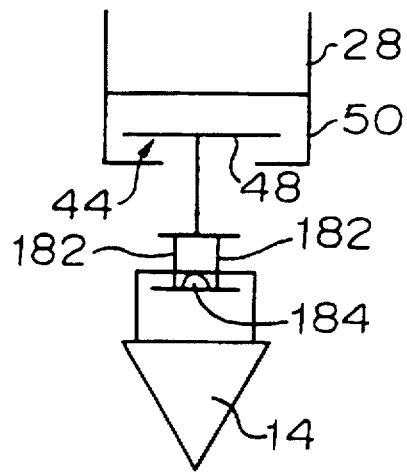
FIG. 22 is a schematic view illustrating how the plunger is supported by hanger bolts and a spherical part so as to be tiltable with respect to the plunger flange.

In FIG. 22, there is shown a schematic view showing the principle of another embodiment of the plunger supporting mechanism according to the present invention.

The plunger supporting mechanism shown in FIG. 22 supports the plunger 14 so as to be tiltable with respect to the plunger flange 48 like the plunger supporting mechanism shown in FIG. 21. The plunger supporting mechanism of FIG. 22 has substantially the same structure as the tilting unit 46 shown in FIG. 4, and is constituted by three hanger bolts 182, and a spherical part 184 like a ball joint bearing.

According to such a plunger supporting mechanism as well, the restoring force of the press machine which causes on raising the plunger 14 can be absorbed by tilting movement due to co-operation of the hanger bolts 182 and the spherical part 184 to be prevented from being transmitted the plunger 14, avoiding a case wherein glass formed products are fissured or chipped. However, the embodiments shown in FIGS. 21 and 22 make setting of the tilting parts difficult in comparison with the embodiments shown in FIGS. 4, 6 and 7 because the tilting parts, which require fine setting, lie at the side of plunger 14, i.e. a side susceptible to be hot and are apt to be subjected to thermal deformation. In addition, the embodiments shown in FIG. 21 and 22 might interfere with the pressing operation because an inclination adjusting member such a weight member is required to be attached to a portion near to the mold. From this standpoint, the embodiments shown in FIGS. 4, 6 and 7 are more advantageous.

Figure 23:
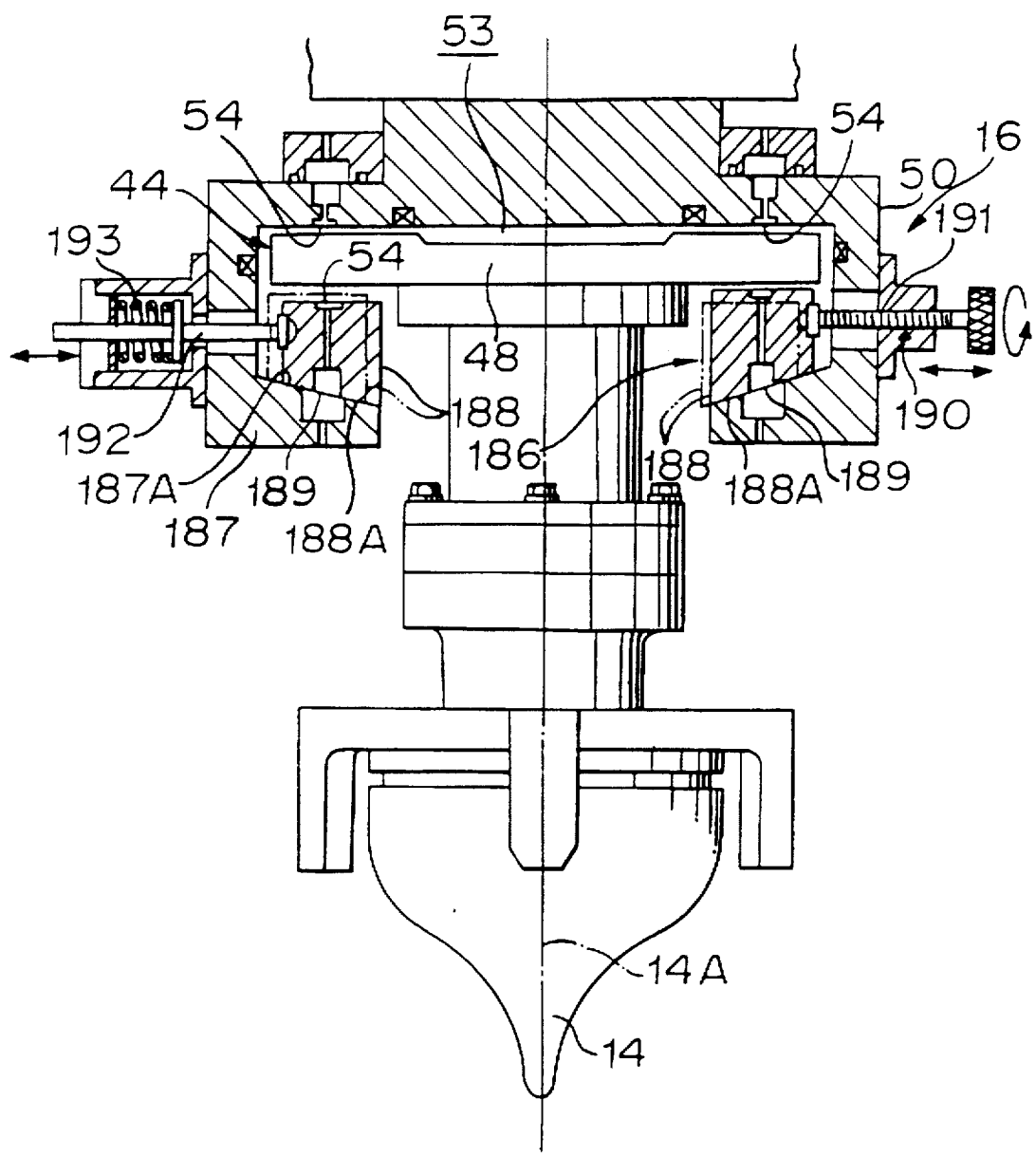
FIG. 23 is a sectional view of the plunger supporting mechanism according to another embodiment of the present invention.
Figure 24:
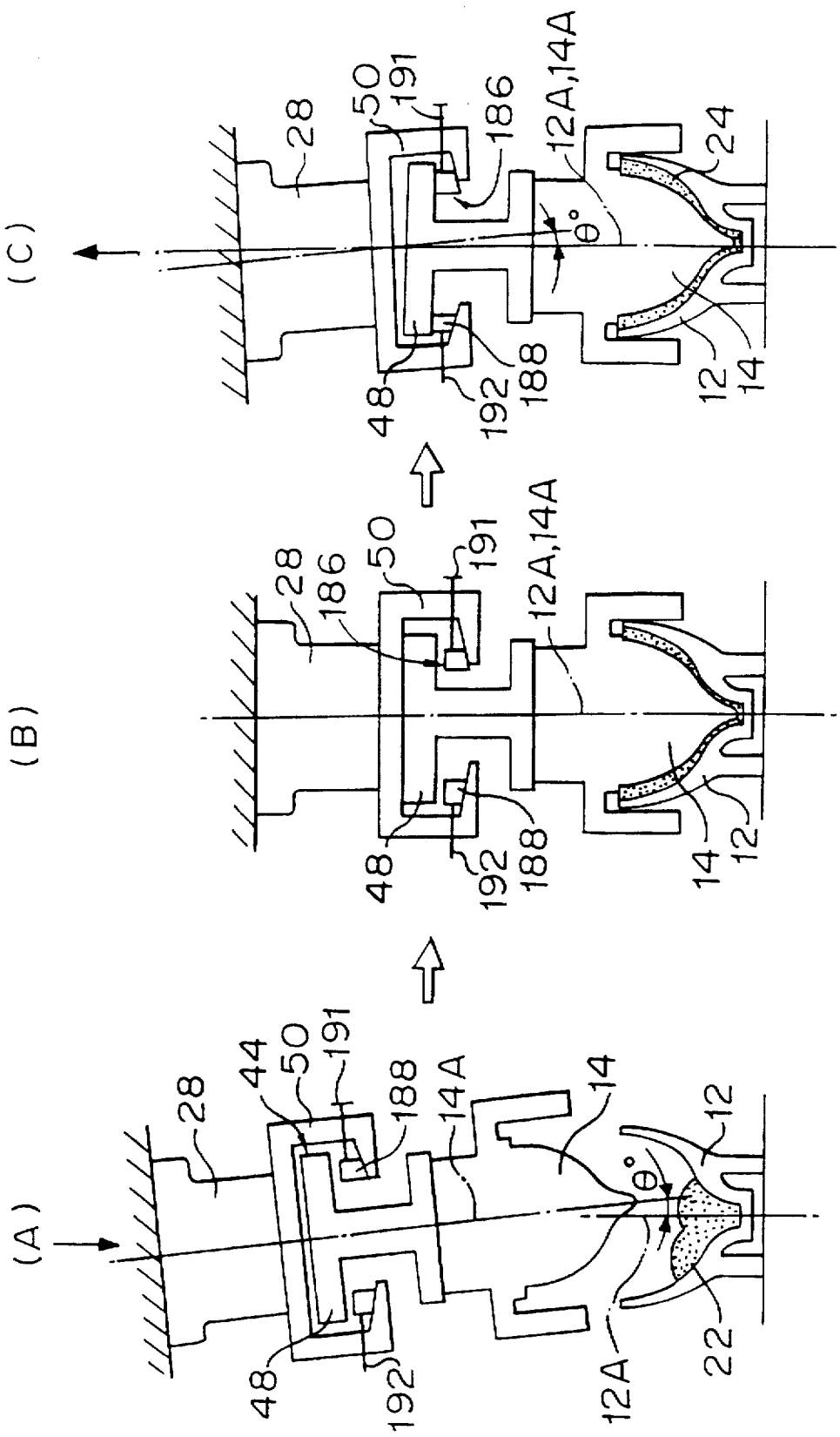
FIGS. 24(A)–(C) are schematic views illustrating the operation of the plunger supporting mechanism shown in FIG. 23.
Figure 25:
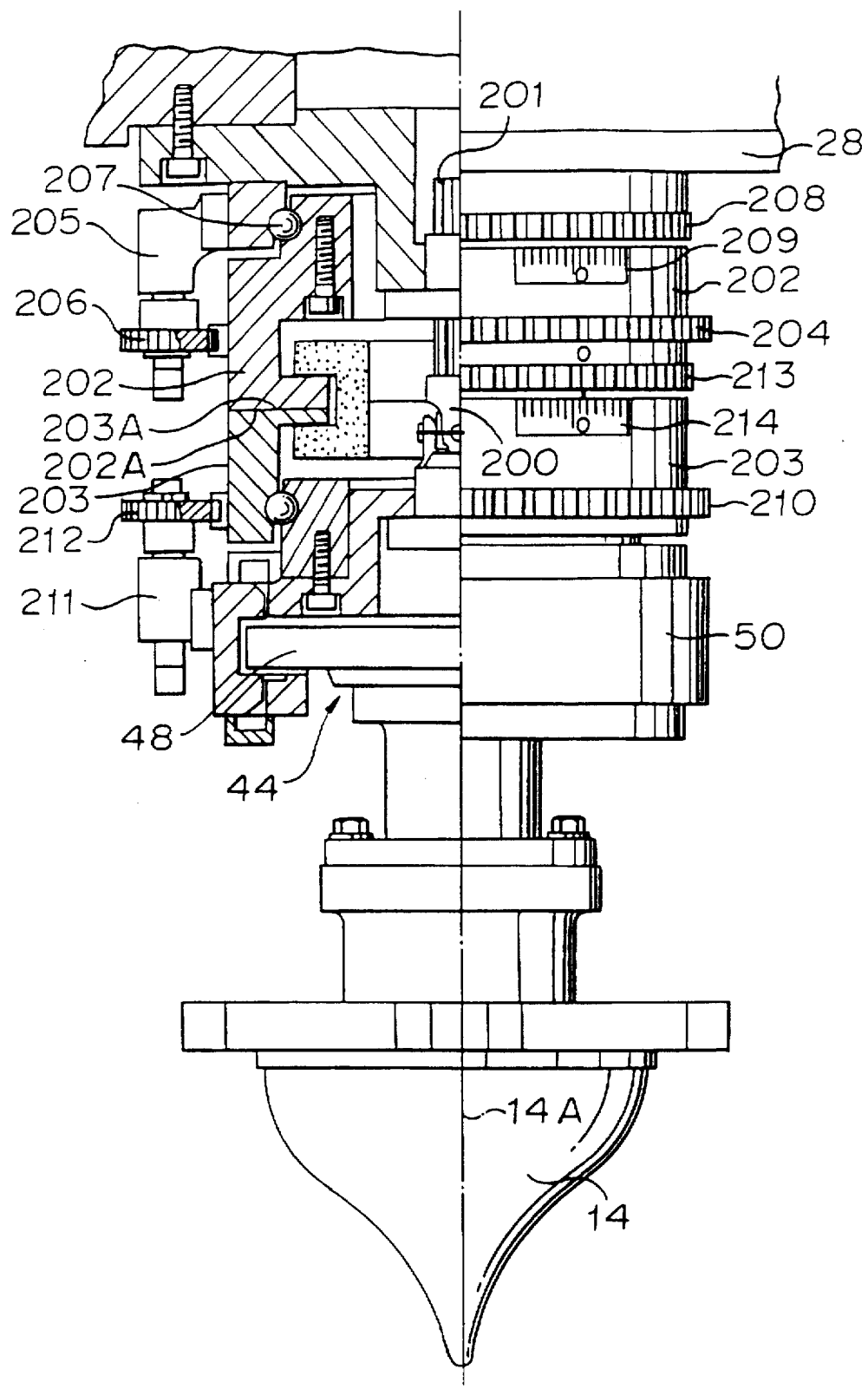
FIG. 25 is a partial sectional view of the plunger supporting mechanism according to another embodiment of the present invention.

In FIGS. 23–25, there are shown other embodiments of the plunger supporting mechanism according to the present invention. The plunger supporting mechanisms 16 according to one of the other embodiments is constituted by a floating unit 44 and a plunger position holding unit 186 as shown in FIG. 23.

The floating unit 44 uses compressed air to support in a floating manner a flange 48 provided on top of the plunger 14 like the embodiments as stated earlier. The flange 48 is arranged in a space 53 formed in a frame part 50, and the flange is supported in the space in the floating manner by the compressed air which is fed through capillary choke nozzles 54. A plurality of the capillary choke nozzles 54 are formed on an upper portion of the frame part 50 and a position adjusting ring (position adjusting member) 188 of the plunger position holding unit 186. The capillary choke nozzles 54 in the frame part 50 are connected to a compressed air supply source through pipes not shown, and the capillary choke nozzles 54 in the position adjusting ring 188 are connected to the compressed air supply source through air introduction holes 189 formed in a lower portion of the frame part 50 and the pipes not shown.

The plunger position holding unit 186 keeps the plunger 14 in the position on pressing, i.e. keeps the plunger 14 inclined if the plunger 14 is inclined on pressing. The plunger position holding unit 186 includes the position adjusting ring 188, and an adjusting portion (an operating unit) 190 for adjusting the position of the position adjusting ring 188 in the vertical direction.

The position adjusting ring 188 is arranged in the frame part 50, and is put on an upper surface 187A of a lower flange 187 of the frame part 50. The upper surface 187A is formed in a conical shape so as to be inclined downward, and the position adjusting ring 188 also has a lower surface 188A formed in a conical shape so that the position adjusting ring 188 can be smoothly slidable along the upper surface 187A. When the position adjusting ring 188 slides along the upper surface 187A, the position adjusting ring 188 has an upper surface moved in the vertical direction. As a result, the gap between the upper surface of the position adjusting ring 188 and the plunger flange 48 can be controlled by adjusting the sliding position of the position adjusting ring 188.

The sliding position of the position adjusting ring 188 can be adjusted by the adjusting portion 190. The adjusting portion 190 is constituted by a screw bar 191 and a pushing stem 192. The screw bar 191 is screwed into a side portion of the frame part 50. When the screw bar is screwed into the frame part 50, the position adjusting ring 188 is pushed by a leading edge of the screw bar 191 to be moved in the left direction in FIG. 23. The pushing stem 192 is arranged at a position opposite to the screw bar 191. The pushing stem urges the position adjusting ring 188 in the right direction in FIG. 23 by the action of a Belleville spring 193. When the screw bar 191 is screwed into the frame part, the position adjusting ring 188 is moved in the left direction in FIG. 23 against the action of the Belleville spring 193. When the screw bar 191 is loosened, the position adjusting ring is moved in the right direction in FIG. 23 by the action of the Belleville spring 193.

Now, the function of the plunger supporting mechanism thus constructed according to the embodiment of FIG. 23 will be explained referring to schematic views of FIGS. 24(A)–(C). Even if the axis 14A of the plunger 14 is out of alignment with the axis 12A of the bottom mold 12 on pressing as shown in FIG. 24(A), the plunger 14 pressures and forms the gob 22 while the movement of the plunger 14 is rectified so as to put the axis 14A of the plunger 14 into alignment of the axis 12A of the bottom mold 12 as shown in FIG. 24(B). The plunger flange 48 is supported in the floating manner by the floating unit 44. In that manner, the gob 22 is pressed into the funnel glass 24. At that time, the head 28 and the rod 32 above the frame part 50 (see FIG. 1) follow the rectified movement of the plunger 14 to be elasticly deformed (inclined).

Next, the screw bar 191 of the plunger position holding unit 186 is rotated to slide the position adjusting ring 188 so as to adjust the position of the position adjusting ring 188 with respect to the plunger flange 48 in the vertical direction during the pressing operation shown in FIG. 24(B). For example, when the plunger 14 is raised, the frame part 50 is counterclockwise tilted having a rotational angle of θ° in FIG. 24, and returns to the original position. For this reason, the position of the position adjusting ring in the vertical direction is adjusted so that the position adjusting ring 188 is slid in advance to a position (a left portion in FIGS. 24(A)–(C)) where the upper surface of the position adjusting ring 188 with the frame part 50 tilted at the rotational angle of θ° is parallel with the lower surface of the plunger flange 48 on pressing.

When the plunger 14 is raised as shown in FIG. 24(C) after completion of pressing, the frame part 50 is counterclockwise tilted having the rotational angle of θ° by a restoring force though the restoring force applied to the frame part 50 is not transmitted to the plunger flange 48 because the position adjusting ring 188 is adjusted to occupy the position stated above.

When the frame part 50 is raised in such a state, the plunger 14 is raised while the entire upper surface of the position adjusting ring 188 contacts with the lower surface of the plunger flange 48. As a result, the plunger 14 is raised while keeping the tilted position on pressing (the tilted position shown in FIG. 24(B)), i.e. while being put into alignment with the bottom mold 12, thereby preventing the leading portion of the plunger 14 from scooping the funnel glass 24. According to this embodiment, the funnel glass 24 can be prevented from being fissured or chipped.

In FIG. 25, there is shown a partially sectional view of the essential parts of the plunger supporting mechanism according to another embodiment of the present invention. Like reference numerals indicate identical or similar parts to the parts in the embodiment shown in FIG. 23, and explanation on those parts will be omitted.

The plunger supporting mechanism shown in FIG. 25 functions to bring the plunger axis 14A in alignment with the axis 12A of the bottom mold in advance.

A frame part 50 of a floating unit 44 is supported by a head 28 through a universal joint 200 and a spline 201. The universal joint 200 makes the frame part tiltable, and the spline 201 restricts the rotation of the frame part.

Between the head 28 and the frame part 50 are arranged a first tilting ring 202 as rotational angle adjusting means and a second tilting ring 203 as tilt angle adjusting means in the vertical direction. The tilting rings 202 and 203 have inclined surfaces 202A and 203A formed at a predetermined tilt angle. The tilting rings are arranged to be rotatable about the plunger axis 14A so that the inclined surfaces 202A and 203A are closely contacted. The first tilting ring 202 has a circumferential part formed with a gear 204, which meshes with a pinion 206 of an electric motor 205. The electric motor 205 is fixed to the head 28, and the first tilting ring 202 is rotatable with respect to the electric motor 205 by means of a bearing 207. When the electric motor 205 is driven, the first tilting ring 202 is rotated through the pinion 206 and the gear 204, and the rotational angle of the first tilting ring is measured by a graduation 208 indicated on the head 28 and a vernier dial 209 indicated on the first tilting ring 202.

Like the first tilting ring 202, the second tilting ring 203 also has a circumferential portion formed with a gear 210, which meshes with a pinion 212 of an electric motor 211. The electric motor 211 is fixed to a side portion of the frame part 50. When the electric motor 211 is driven, the second tilting ring 203 is rotated through the pinion 212 and the gear 210, and the rotational angle of the second tilting ring is measured by a graduation 213 indicated on the first tilting ring 202 and a vernier dial 214 indicated on the second tilting ring 203.

Now, the operation of the plunge supporting mechanism thus constructed according to this embodiment will be explained.

First, an operation wherein the plunger axis 14A is brought into alignment with axis 12A of the bottom mold 12 before pressing (see FIG. 24(A)) is carried out.

In this operation, the second tilting ring 203 as the tilt angle adjusting means is rotated by the electric motor 211 to begin with. When the second tilting ring 203 rotates, the inclined surface 203A of the second tilting ring 203 rotates along the inclined surface 202A of the first tilting ring 202 to start tilting the second tilting ring 203, following that the frame part 50 is tilted under the action of the universal joint 200. The tilt angle of the plunger axis 14A is made to match that of the axis 12A of the bottom mold 12 by adjusting the rotational angle of the second tilting ring 203 while watching the graduation 213 and the vernier dial 214.

Next, the first tilting ring 202 as the rotational angle adjusting means is rotated by the electric motor 205. At that time, the second titling ring 203 is fixed to the first tilting ring 202 by use of a locking jig (not shown) in advance. When the first tilting ring 202 rotates, the second tilting ring 203 starts rotating along with the first tilting ring. In that manner, the frame part 50 and the plunger 14 tilt together in an oscillating manner keeping the tilt angle. The plunger axis 14A can be brought into alignment with the axis 12A of the bottom mold 12 by adjusting the rotational angle of the first tilting ring 202 while watching the graduation 208 and the vernier dial 209.

When the pressing operation is carried out after completion of the alignment operation, the gob 22 is pressured and formed keeping the plunger axis 14A in alignment with the bottom mold axis 12A because the plunger 14 has had the axis 14A brought into alignment with the bottom mold axis 12A. Likewise, the plunger is raised keeping the plunger axis in alignment with the bottom mold axis 12A.

In that manner, the plunger supporting mechanism according to this embodiment can also prevent the funnel glass 24 from being fissured or chipped.

As explained, in accordance with the plunger supporting mechanism of the present invention, the floating unit is supported so as to be tiltable with respect to the press machine, the restoring force of the press machine is absorbed by the tilting movement, and the plunger is raised in the inclined state. As a result, glass formed products can be free from fissures or chips.

In addition, in accordance with the plunger supporting mechanism with the plunger position holding means of the present invention, the plunger can be raised keeping its position on pressing, i.e. keeping the plunger axis in alignment with the bottom mold axis. As a result, it is possible to stably form a glass product with high quality, having no fissures or chips.

Obviously, numerous modifications and variations of the present invention are possible in light of the above teachings. It is therefore to be understood that within the scope of the appended claims, the invention may be practiced otherwise than as specifically described herein.

What is claimed is:

1. A plunger supporting mechanism comprising:
   a bottom mold into which a gob is loaded;
   a plunger which is arranged above the bottom mold, and which is lowered to pressure the gob in the bottom mold to press the gob into a glass product, the plunger having an upper portion provided with a flange;
   a floating unit which supports the flange to support the plunger so as to be movable in a horizontal direction; and
   a press machine for raising and lowering the plunger through the floating unit;
   wherein the floating unit is supported so as to be tiltable with respect to the press machine, or the plunger is supported so as to be tiltable with respect to the flange.

2. A plunger supporting mechanism according to claim 1, wherein the floating unit is provided with a re-centering mechanism, and an axis of the plunger is brought into alignment with an axis of the floating unit by the re-centering mechanism.

3. A plunger supporting mechanism according to claim 2, wherein the re-centering mechanism is a non-contacting re-centering mechanism which brings the plunger axis into alignment with the floating unit axis.

4. A plunger supporting mechanism according to claim 1, wherein the floating unit is supported in suspension by a plurality of hanger members, the plurality of hanger members having one end connected to the press machine, and a spherical part provided on another end of the hanger members to support the floating unit to be tiltable with respect to the press machine.

5. A plunger supporting mechanism according to claim 1, wherein the floating unit is supported so as to be tiltable with respect to the press machine by use of a ball joint.

6. A plunger supporting mechanism according to claim 1, wherein the floating unit is supported in suspension by a plurality of hanger members, the plurality of hanger members having one end connected to the press machine, and a hydraulic fluid device connected to another end of the plurality of hanger members, the floating unit being tiltable with respect to the press machine by use of the hydraulic fluid device by use of viscous resistance of a hydraulic fluid.

7. A plunger supporting mechanism according to claim 1, wherein the plunger supporting mechanism is provided with position holding means for holding the floating unit at a predetermined tilted position.

8. A plunger supporting mechanism according to claim 1, wherein the floating unit is provided with a weight member so as to be removable, the weight member bringing an axis of the plunger into alignment with an axis of the bottom mold.

9. A plunger supporting mechanism according to claim 1, wherein the floating unit is provided with a re-centering mechanism which supplies compressed air to a circumferential surface of the plunger flange to bring an axis of the plunger into alignment with an axis of the floating unit.

10. A plunger supporting mechanism according to claim 1, wherein the floating unit is formed with an orifice type nozzle which supplies compressed air to hold the plunger flange.

11. A plunger supporting mechanism comprising:
    a bottom mold into which a gob is loaded;
    a plunger which is arranged above the bottom mold, and which is lowered to pressure the gob in the bottom mold to press the gob into a glass product, the plunger having an upper portion provided with a flange;
    a floating unit which supports the flange to support the plunger so as to be movable in a horizontal direction; and
    a press machine for raising and lowering the plunger through the floating unit;
    wherein there is provided plunger position holding means for keeping the plunger position on pressing when the plunger is raised.

12. A plunger supporting mechanism according to claim 11, wherein the plunger position holding means is constituted by a position adjusting member and an operating unit; the position adjusting member contacting a frame of the floating unit, having an upper surface formed at a position opposed to a lower surface of the plunger flange so as to be movable in a vertical direction, and contacting the lower surface of the plunger flange so as to raise the plunger on raising of the floating unit; and the operating unit adjusting a position of the upper surface of the position adjusting member so as to raise the plunger while keeping the plunger in the same position as on pressing.

13. A plunger supporting mechanism according to claim 11, further comprising a re-centering mechanism connected to a frame of the floating unit, the re-centering mechanism located adjacent to the flange so as to bring an axis of the plunger into alignment with an axis of the floating unit.

14. A plunger supporting mechanism according to claim 13, wherein the re-centering mechanism is a non-contacting re-centering mechanism which brings the axis of the plunger into alignment with the axis of the floating unit.

15. A plunger supporting mechanism according to claim 11, wherein the floating unit is provided with a re-centering mechanism which supplies compressed air to a circumferential surface of the plunger flange to bring an axis of the plunger into alignment with an axis of the floating unit.

16. A plunger supporting mechanism according to claim 11, wherein the floating unit is formed with an orifice type nozzle, which supplies compressed air to hold the plunger flange.

17. A plunger supporting mechanism comprising:

a bottom mold into which a gob is loaded;

a plunger which is arranged above the bottom mold, and which is lowered to pressure the gob in the bottom mold to press the gob into a glass product, the plunger having an upper portion provided with a flange;

a floating unit which supports the flange to support the plunger so as to be movable in a horizontal direction; and a press machine for raising and lowering the plunger through the floating unit;

wherein there is further provided alignment means for inclining an axis of the plunger to bring it into alignment with an axis of the bottom mold.

18. A plunger supporting mechanism according to claim 17, wherein the alignment means is constituted by tilt angle adjusting means for tilting the floating unit with respect to the press machine so as to match a tilt angle of the plunger axis to that of the bottom mold axis, and rotational angle adjusting means for rotating the floating unit with respect to the press machine to bring the plunger axis into alignment with the bottom mold axis.

* * * * *